US009859723B2

(12) United States Patent
Chae et al.

(10) Patent No.: US 9,859,723 B2
(45) Date of Patent: Jan. 2, 2018

(54) APPARATUS AND METHOD FOR ADJUSTING CHARGE/DISCHARGE RANGE OF VEHICLE BASED ON EVENTS

(71) Applicant: HANWHA TECHWIN CO.,LTD., Changwon-si (KR)

(72) Inventors: Heeseo Chae, Changwon-si (KR); Yongjoon Chang, Changwon-si (KR); Youngsik Oh, Changwon-si (KR)

(73) Assignee: HANWHA LAND SYSTEMS CO., LTD., Changwon-si (KR)

( * ) Notice: Subject to any disclaimer, the term of this patent is extended or adjusted under 35 U.S.C. 154(b) by 190 days.

(21) Appl. No.: 14/693,469

(22) Filed: Apr. 22, 2015

(65) Prior Publication Data

US 2016/0190820 A1  Jun. 30, 2016

(30) Foreign Application Priority Data

Dec. 30, 2014 (KR) .................. 10-2014-0193847

(51) Int. Cl.
*H01M 10/44* (2006.01)
*H02J 7/00* (2006.01)
*B60L 11/18* (2006.01)

(52) U.S. Cl.
CPC ............. *H02J 7/0021* (2013.01); *B60L 11/18* (2013.01)

(58) Field of Classification Search
CPC .................................................. H02J 7/0021
USPC ........................................................ 320/134
See application file for complete search history.

(56) References Cited

U.S. PATENT DOCUMENTS

| 6,484,087 B2 * | 11/2002 | Shirai ................... B60W 30/16 180/169 |
| 7,649,338 B2 * | 1/2010 | Seo ....................... B60W 10/26 320/132 |
| 8,428,804 B2 * | 4/2013 | Sakai ....................... B60L 1/00 180/65.28 |
| 8,583,310 B2 * | 11/2013 | Hashimoto ......... B60L 11/1803 180/65.21 |

(Continued)

FOREIGN PATENT DOCUMENTS

| JP | 2014-51270 A | 3/2014 |
| KR | 10-0896216 B1 | 5/2009 |

(Continued)

*Primary Examiner* — Drew A Dunn
*Assistant Examiner* — Jerry D Robbins
(74) *Attorney, Agent, or Firm* — Sughrue Mion, PLLC

(57) ABSTRACT

Provided is a vehicle controlling apparatus including: an inputter configured to detect an event; a battery manager configured to check a first battery charge/discharge range corresponding to a range for preventing a decrease in a lifespan of a battery and configured to determining whether the first battery charge/discharge range is equal to a second battery charge/discharge range corresponding to a range for the event, wherein if the first battery charge/discharge range is different from the second battery charge/discharge range, the battery manager is configured to set a third battery charge/discharge range corresponding to the second battery charge/discharge range; a memory configured to store the third battery charge/discharge range; and a controller configured to control charging or discharging of the battery within the third battery charge/discharge range.

20 Claims, 13 Drawing Sheets

(56) References Cited

U.S. PATENT DOCUMENTS

| | | | |
|---|---|---|---|
| 8,718,843 B2* | 5/2014 | Kubota | B60L 1/20 701/22 |
| 8,886,479 B2* | 11/2014 | Matsumoto | B60L 11/123 320/106 |
| 2003/0230443 A1* | 12/2003 | Cramer | B60G 3/20 180/65.51 |
| 2004/0230376 A1* | 11/2004 | Ichikawa | G01C 21/26 702/2 |
| 2006/0152196 A1* | 7/2006 | Matsumoto | H02J 7/0029 320/132 |
| 2013/0325335 A1* | 12/2013 | Kee | G01C 21/3469 701/527 |
| 2014/0054100 A1* | 2/2014 | Boskovitch | B60K 6/46 180/242 |
| 2014/0058609 A1* | 2/2014 | Matsuda | B62J 99/00 701/22 |
| 2014/0067175 A1 | 3/2014 | Cho et al. | |
| 2015/0224845 A1* | 8/2015 | Anderson | B60G 17/019 701/37 |

FOREIGN PATENT DOCUMENTS

| | | |
|---|---|---|
| KR | 10-2012-0114660 A | 10/2012 |
| KR | 10-2013-0140991 A | 12/2013 |
| WO | 2013/141621 A1 | 9/2013 |

* cited by examiner

APPARATUS AND METHOD FOR ADJUSTING CHARGE/DISCHARGE RANGE OF VEHICLE BASED ON EVENTS

CROSS-REFERENCE TO RELATED APPLICATION

This application claims priority from Korean Patent Application No. 10-2014-0193847, filed on Dec. 30, 2014, in the Korean Intellectual Property Office, the disclosure of which is incorporated herein by reference in its entirety.

BACKGROUND

1. Field

Methods and apparatuses consistent with exemplary embodiments relate to controlling a vehicle, and more particularly, to controlling a vehicle while efficiently using a battery.

2. Description of the Related Art

Methods of using batteries within charge/discharge ranges determined according to various driving conditions have been proposed as methods for efficiently controlling the charging/discharging of batteries. For example, such driving conditions may be information about locations, road congestion, or vehicle velocity. However, such information may be varied according to drivers' driving propensities or road conditions, and thus it is difficult to reliably use such information.

SUMMARY

One or more exemplary embodiments include an apparatus and method for controlling charging/discharging of a battery according to driving conditions in a medium-sized or large vehicle.

Additional aspects will be set forth in part in the description which follows and, in part, will be apparent from the description, or may be learned by practice of the presented embodiments.

According to an aspect of an exemplary embodiment, there is provided an apparatus for controlling a vehicle including: an inputter detecting an event; a battery manager checking a current battery charge/discharge range and determining whether the current battery charge/discharge range is applicable to the event, wherein if the current battery charge/discharge range is not applicable to the event, the battery manager sets a battery charge/discharge range applicable to the event; a memory storing the current battery charge/discharge range and the set battery charge/discharge range applicable to the event; and a controller controlling charging/discharging of a battery within the set battery charge/discharge range.

The inputter may detect an input steering angle greater than a reference steering angle as the event, and the memory may further store a battery charge/discharge range applied to the input steering angle and may update a battery charge/discharge range applicable to the input steering angle based on the battery charge/discharge range applied to the input steering angle.

As the event, the inputter may detect a steering timing and an input steering angle smaller than a reference steering angle, and the memory may further store a battery charge/discharge range applied to the input steering angle and may update a battery charge/discharge range applicable to the input steering angle based on the battery charge/discharge range applied to the input steering angle.

The inputter may include one or more of an electric power steering device detecting an Ackerman steering type input and a user interface receiving a skid steering type remote driving command, and an Ackerman steering type input steering angle or a skid steering type input steering angle may be detected as the event.

The inputter may detect uphill driving as the event, and the memory may further store a battery charge/discharge range applied to the uphill driving and may update a battery charge/discharge range applicable to the uphill driving based on the battery charge/discharge range applied to the uphill driving.

The inputter may detect downhill driving as the event, the battery manager differently may set a battery charge range applicable to the downhill driving and a battery discharge range applicable to the downhill driving, wherein if the downhill driving is detected, the controller may cause the battery and a wheel motor to be intensively cooled, and the memory may further store a battery charge/discharge range applied to the downhill driving and may update the battery charge range applicable to the downhill driving and the battery discharge range applicable to the downhill driving based on the battery charge/discharge range applied to the downhill driving.

The inputter may include one or more of an altitude sensor and a gyro sensor.

The inputter may receive a command for stealth driving as the event when the stealth driving may be not possible, the battery manager may differently set a battery charge range applicable to the stealth driving and a battery discharge range applicable to the stealth driving, and if the battery is charged to a charge level higher than a first reference value, the controller starts the stealth driving.

The inputter may receive a command for stealth driving as the event when the stealth driving is possible, the battery manager may set a battery discharge range applicable to the stealth driving, and if the battery is discharged to a charge level lower than a second reference value, the controller stops the stealth driving.

The inputter may receive an input of turn-to-right stationary steering or turn-to-left stationary steering as the event, wherein if the input of turn-to-right stationary steering is detected, the controller may cause at least one wheel motor related to the turn-to-right stationary steering to be cooled, and if the input of turn-to-left stationary steering is detected, the controller may cause at least one wheel motor related to the turn-to-left stationary steering to be cooled, and the memory may further store a battery charge/discharge range applied to the stationary steering and may update a battery charge/discharge range applicable to the stationary steering based on the battery charge/discharge range applied to the stationary steering.

According to an aspect of another exemplary embodiment, there is provided a method of controlling a vehicle including: detecting an event; checking a current battery charge/discharge range; determining whether the current battery charge/discharge range is applicable to the event; if the current battery charge/discharge range is not applicable to the event, setting a battery charge/discharge range applicable to the event; and charging/discharging a battery within the set battery charge/discharge range.

The event may be an input steering angle greater than a reference steering angle, and the method may further include: storing a battery charge/discharge range applied to the input steering angle; and updating a battery charge/ discharge range applicable to the input steering angle based on the battery charge/discharge range applied to the input steering angle.

The event may be an input steering angle that is smaller than a reference steering angle at a steering timing, and the method may further include: storing a battery charge/discharge range applied to the input steering angle; and updating a battery charge/discharge range applicable to the input steering angle based on the battery charge/discharge range applied to the input steering angle.

The event may be an Ackerman steering type input steering angle or a skid steering type input steering angle.

The event may be uphill driving, and the method may further include: storing a battery charge/discharge range applied to the uphill driving; and updating a battery charge/discharge range applicable to the uphill driving based on the battery charge/discharge range applied to the uphill driving.

The event may be downhill driving, and the setting of the battery charge/discharge range applicable to the event may include differently setting a battery charge range applicable to the downhill driving and a battery discharge range applicable to the downhill driving, wherein the method may further include: if the downhill driving may be detected, intensively cooling the battery and a wheel motor; storing a battery charge/discharge range applied to the downhill driving; and updating the battery charge range applicable to the downhill driving and the battery discharge range applicable to the downhill driving based on the battery charge/discharge range applied to the downhill driving.

The detecting of the event may be performed using one or more of an altitude sensor and a gyro sensor.

The event may be a command for stealth driving that is received when the stealth driving is not possible, and the setting of the battery charge/discharge range applicable to the event may include differently setting a battery charge range applicable to the stealth driving and a battery discharge range applicable to the stealth driving, wherein if the battery is charged to a charge level higher than a first reference value, the method may further include starting the stealth driving.

The event may be a command for stealth driving that is received when the stealth driving is possible, the setting of the battery charge/discharge range applicable to the event may include setting a battery discharge range applicable to the stealth driving, and the charging/discharging of the battery may include discharging the battery within the set battery discharge range, wherein if the battery is discharged to a charge level lower than a second reference value, the method may further include stopping the stealth driving.

The event may be an input of turn-to-right stationary steering or turn-to-left stationary steering, and the method may further include: if the input of turn-to-right stationary steering is detected, cooling at least one wheel motor related to the turn-to-right stationary steering, and if the input of turn-to-left stationary steering is detected, cooling at least one wheel motor related to the turn-to-left stationary steering; storing a battery charge/discharge range applied to the stationary steering; and updating a battery charge/discharge range applicable to the stationary steering based on the battery charge/discharge range applied to the stationary steering.

Other aspects will become apparent and more readily appreciated from the accompanying drawings, claims, and detailed description.

According to the exemplary embodiments, factors such as operations of cooling devices or extension of battery charge/discharge ranges are controlled according to various driving conditions of medium-sized or large vehicles, thereby improving energy efficiency and battery lifespan.

According to an aspect of another exemplary embodiment, there is provided an apparatus for controlling a vehicle, the apparatus including: an inputter configured to detect an event; a battery manager configured to check a first battery charge/discharge range corresponding to a range for preventing a decrease in a lifespan of a battery and configured to determining whether the first battery charge/discharge range is equal to a second battery charge/discharge range corresponding to a range for the event, wherein if the first battery charge/discharge range is different from the second battery charge/discharge range, the battery manager is configured to set a third battery charge/discharge range corresponding to the second battery charge/discharge range; a memory configured to store the third battery charge/discharge range; and a controller configured to control charging or discharging of the battery within the third battery charge/discharge range.

In response to the inputter detecting an input steering angle as the event greater than a reference steering angle, the memory may be configured to store a battery charge/discharge range applied to the input steering angle and configured to update a battery charge/discharge range for the input steering angle based on the battery charge/discharge range applied to the input steering angle.

In response to the inputter detecting a steering timing and an input steering angle smaller than a reference steering angle, the memory may be configured to store a battery charge/discharge range applied to the input steering angle and configured to update a battery charge/discharge range for the input steering angle based on the battery charge/discharge range applied to the input steering angle.

The inputter may include: at least one electric power steering device configured to detect an Ackerman steering type input; and a user interface configured to receive a skid steering type remote driving command, and wherein the inputter may be configured to detect an Ackerman steering type input steering angle or a skid steering type input steering angle as the event.

In response to the inputter detecting uphill driving as the event, the memory may be configured to store a battery charge/discharge range applied to the uphill driving and configured to update a battery charge/discharge range for the uphill driving based on the battery charge/discharge range applied to the uphill driving.

In response to the inputter detecting downhill driving as the event, the battery manager may be configured to set a battery charge range applicable to the downhill driving and a battery discharge range for the downhill driving, wherein in response to the inputter detecting the downhill driving, the controller may be configured to cool the battery and a wheel motor, and wherein the memory may be configured to store a battery charge/discharge range applied to the downhill driving and configured to update the battery charge range for the downhill driving and the battery discharge range for the downhill driving based on the battery charge/discharge range applied to the downhill driving.

The inputter may include at least one of an altitude sensor and a gyro sensor.

In response to the inputter receiving a stealth driving command as the event when stealth driving is inoperable, the battery manager may be configured to set a battery charge range for the stealth driving and a battery discharge range for the stealth driving, and wherein in response to the battery being charged to a charge level higher than a first reference value, the controller may be configured to start the stealth driving.

In response to the inputter receiving a command for stealth driving as the event when the stealth driving is operable, the battery manager may be configured to set a battery discharge range for the stealth driving, and wherein in response to the battery being discharged to a charge level lower than a second reference value, the controller may be configured to stop the stealth driving.

In response to the inputter receiving an input of turn-to-right stationary steering or turn-to-left stationary steering as the event, the controller may be configured to cause at least one wheel motor related to the input to be cooled, and wherein the memory is configured to store a battery charge/discharge range applied to the stationary steering and configured to update a battery charge/discharge range for the stationary steering based on the battery charge/discharge range applied to the stationary steering.

According to an aspect of another exemplary embodiment, there is provided a method of controlling a vehicle, the method including: detecting an event; checking a first battery charge/discharge range corresponding to a range for preventing a decrease in a lifespan of a battery; determining whether the first battery charge/discharge range is equal to a second battery charge/discharge range corresponding to a range for the event; if the first battery charge/discharge range is different from the second battery charge/discharge range, setting a third battery charge/discharge range corresponding to the second battery charge/discharge range; and charging or discharging the battery within the third battery charge/discharge range.

In response to the event being an input steering angle greater than a reference steering angle, the method may further include: storing a battery charge/discharge range applied to the input steering angle; and updating a battery charge/discharge range for the input steering angle based on the battery charge/discharge range applied to the input steering angle.

In response to the event being an input steering angle that is smaller than a reference steering angle at a steering timing, the method may further include: storing a battery charge/discharge range applied to the input steering angle; and updating a battery charge/discharge range for the input steering angle based on the battery charge/discharge range applied to the input steering angle.

The event may include an Ackerman steering type input steering angle or a skid steering type input steering angle.

In response to the event being uphill driving, the method may further include: storing a battery charge/discharge range applied to the uphill driving; and updating a battery charge/discharge range for the uphill driving based on the battery charge/discharge range applied to the uphill driving.

In response to the event being downhill driving, the setting the third battery charge/discharge range for the event may include setting a battery charge range for the downhill driving and setting a battery discharge range for the downhill driving, wherein the method may further include: in response to the downhill driving being detected, cooling the battery and a wheel motor; storing a battery charge/discharge range applied to the downhill driving; and updating the battery charge range for the downhill driving and the battery discharge range for the downhill driving based on the battery charge/discharge range applied to the downhill driving.

The detecting the event may include using at least one of an altitude sensor and a gyro sensor.

In response to the event being a command for stealth driving when the stealth driving is inoperable, the setting the third battery charge/discharge range for the event may include setting a battery charge range for the stealth driving and a battery discharge range for the stealth driving, wherein in response to the battery being charged to a charge level higher than a first reference value, the method may further include starting the stealth driving.

In response to the event being a command for stealth driving when the stealth driving is operable, the setting the third battery charge/discharge range for the event may include setting a battery discharge range for the stealth driving, and the charging or discharging the battery includes discharging the battery within the third battery discharge range, wherein in response to the battery being discharged to a charge level lower than a second reference value, the method may further include stopping the stealth driving.

In response to the event being an input of turn-to-right stationary steering or turn-to-left stationary steering, and the method may further include: cooling at least one wheel motor related to the input; storing a battery charge/discharge range applied to the stationary steering; and updating a battery charge/discharge range for the stationary steering based on the battery charge/discharge range applied to the stationary steering.

BRIEF DESCRIPTION OF THE DRAWINGS

The above and/or other aspects of the disclosure will become apparent and more readily appreciated from the following description of the exemplary embodiments, taken in conjunction with the accompanying drawings in which.

DETAILED DESCRIPTION

Figure 1:
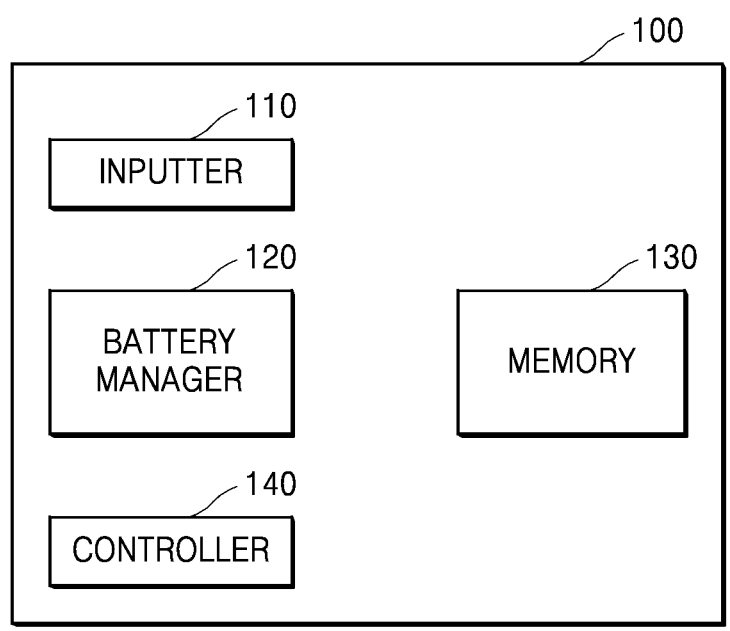
FIG. 1 is a block diagram illustrating an apparatus for controlling a vehicle according to an exemplary embodiment.

Reference will now be made in detail to exemplary embodiments, examples of which are illustrated in the accompanying drawings. In this regard, the exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list. Moreover, detailed descriptions related to well-known functions or configurations will be ruled out in order not to unnecessarily obscure subject matters of the exemplary embodiments.

Hereinafter, the exemplary embodiments will be described in detail with reference to the accompanying drawings. In the drawings, like reference numerals denote like elements, and overlapping descriptions thereof will be omitted.

FIG. 1 is a block diagram illustrating an apparatus 100 for controlling a vehicle according to an exemplary embodiment.

Referring to FIG. 1, the vehicle controlling apparatus 100 of the exemplary embodiment includes an inputter 110, a battery manager 120, a memory 130, and a controller 140.

The inputter 110 detects an event.

The event may be a driving condition for determining one or more of the charging or discharging of a battery and the operation of a cooling device. Examples of the event include steering, slope driving, stationary steering, and mission device operations. However, the event is not limited thereto.

For example, the inputter 110 may include at least one selected from a terrain sensor and a front detection sensor. If at least one of the terrain sensor and the front detection sensor detects an obstacle within a forward 5-meter range of a road, the inputter 110 may receive a steering angle greater than a reference steering angle. If the inputter 110 receives a steering angle smaller than the reference steering angle, the inputter 110 may calculate steering timing.

In another example, the inputter 110 may include at least one selected from an electric power steering device for detecting an Ackerman steering type input and a user interface for receiving a skid steering type remote driving command. In this case, the inputter 110 may receive an input steering angle for Ackerman steering or an input steering angle for skid steering. An event relating to steering may include one or more of a steering angle greater than a reference steering angle and a steering angle smaller than the reference steering angle.

In another example, the inputter 110 may include at least one selected from an altitude sensor and a gyro sensor. However, the inputter 110 is not limited thereto.

In another example, the inputter 110 may receive a stealth driving command, a stationary steering command, etc. The stationary steering command may include one or more of a turn-to-right stationary steering command and a turn-to-left stationary steering command.

In another exemplary embodiment, if the vehicle is a mission performing vehicle, the inputter 110 may detect whether a mission device of the vehicle is operated. The inputter 110 may include at least one selected from a velocity sensor and an acceleration sensor and may detect one or more of a stationary state and a low-speed driving state of the mission performing vehicle for determining whether the mission device is operated. However, the inputter 110 is not limited thereto.

The battery manager 120 may check the current battery charge/discharge range. In the related art, battery charge/discharge ranges may include an upper limit or a lower limit for preventing a decrease in the lifespan of the battery and maintaining the stability of the battery. For example, the current battery charge/discharge range may be from 40% to 60% which is a standard state of charge (SoC) range.

The battery manager 120 determines whether the current battery charge/discharge range is applicable to the event. For example, the battery manager 120 may determine whether the checked current battery charge/discharge range is suitable for steering, uphill driving, downhill driving, stealth driving, stationary steering, or a mission device operation.

If it is determined that the current battery charge/discharge range is not applicable to the event, the battery manager 120 may set a battery charge/discharge range applicable to the event.

The battery charge/discharge range applicable to the event may include an upper limit or a lower limit so that the vehicle may perform the event while maintaining the lifespan and stability of the battery.

The battery manager 120 may set a battery charge range applicable to the event and a battery discharge range applicable to the event as the same range. For example, the battery manager 120 may set the SoC standard range of 40% to 60% as the battery charge/discharge range applicable to the event. In another example, the battery manager 120 may set a range of 40% to 80% wider than the SoC standard range as the battery charge/discharge range applicable to the event. If the inputter 110 detects steering, uphill driving, or a mission device operation, the battery manager 120 may set the battery charge range applicable to the event and the battery discharge range applicable to the event as the same range. However, the battery manager 120 is not limited thereto.

That is, the battery manager 120 may differently set the battery charge range applicable to the event and the battery discharge range applicable to the event. For example, the battery manager 120 may set a battery charge range of 40% to 80% as the battery charge range applicable to the event and a battery discharge range of 40% to 50% as the battery discharge range applicable to the event. In another example, the battery manager 120 may set a battery charge range of 80% to a max value as the battery charge range applicable to the event and a battery discharge range of 40% to 50% as the battery discharge range applicable to the event. If the inputter 110 detects downhill driving or stealth driving, the battery manager 120 may differently set the battery charge range applicable to the event and the battery discharge range applicable to the event. However, the battery manager 120 is not limited thereto.

The battery manager 120 may set the battery discharge range applicable to the event. For example, the battery manager 120 may set a battery discharge range of maximum 80% to minimum 40% as the battery discharge range applicable to the event. If the inputter 110 detects stealth driving, the battery manager 120 may set the battery discharge range applicable to the event. However, the battery manager 120 is not limited thereto.

The memory 130 stores at least one selected from the current battery charge/discharge range, the battery charge/discharge range applicable to the event, and a battery charge/discharge range applied to the event.

For example, as the current battery charge/discharge range, the memory 130 may store the SoC standard range of 40% to 60% or a battery charge/discharge range most recently set to be applicable to the event. However, the exemplary embodiments of the present disclosure are not limited thereto.

The memory 130 may store the battery charge/discharge range applicable to the event. For example, the memory 130 may store a preset battery charge/discharge range as the battery charge/discharge range applicable to the event. For example, the memory 130 may store a battery charge/discharge range applicable to steering, slope driving, stealth driving, stationary steering, or a mission device operation. However, the exemplary embodiments of the present disclosure are not limited thereto.

The memory 130 may store the battery charge/discharge range applied to the event. For example, after the event is complete, the battery manager 120 may detect the charge level of the battery, for example, 75%, and may store the detected charge level in the memory 130. However, the exemplary embodiments of the present disclosure are not limited thereto. For example, the memory 130 may store a battery charge/discharge range applied to an input steering angle, uphill driving, downhill driving, stationary steering, or a mission device operation. However, the exemplary embodiments of the present disclosure are not limited thereto.

The memory 130 updates the battery charge/discharge range applicable to the event based on a battery charge/discharge range applied to the event. For example, the memory 130 may update the battery charge/discharge range applicable to the event by storing a battery charge level (for example, 75%) detected after the event is complete as an upper limit of the battery charge/discharge range applicable to the event. At this time, the memory 130 may store the updated battery charge/discharge range applicable to the event. The memory 130 may store the updated battery charge/discharge range applicable to the event according to events including an event detected by the inputter 110.

For example, the memory 130 may update a battery charge/discharge range applicable to an input steering angle based on a battery charge/discharge range applied to the input steering angle.

In another example, the memory 130 may update a battery charge/discharge range applicable to uphill driving based on a battery charge/discharge range applied to the uphill driving.

In another example, the memory 130 may individually update a battery charge range and a battery discharge range that are applicable to downhill driving based on a battery charge/discharge range applied to the downhill driving.

In another example, the memory 130 may update a battery charge/discharge range applicable to stationary driving based on a battery charge/discharge range applied to the stationary driving.

The controller 140 controls the charging/discharging of the battery within a battery charge/discharge range set by the battery manager 120. In addition, the controller 140 may control the charging/discharging of the battery within the current battery charge/discharge range which is previously set.

The controller 140 may control the charging of the battery by adjusting operations of an engine and a generator. However, the controller 140 is not limited thereto. The controller 140 may adjust the discharging of the battery by controlling one or more of motors, an electric power steering device, user interfaces, and wheel motors. However, the controller 140 is not limited thereto.

The controller 140 may control the operation of a battery cooling device or a wheel motor cooling device according to events. For example, if the inputter 110 detects downhill driving, the controller 140 may control the operation of cooling devices to intensively cool the battery and the wheel motors. In another example, if the controller 140 detects a turn-to-right stationary steering input through the inputter 110, the controller 140 may control the wheel motor cooling device to cool one or more wheel motors related to turn-to-right steering. In another example, if the controller 140 detects a turn-to-left stationary steering input through the inputter 110, the controller 140 may control the wheel motor cooling device so as to cool one or more wheel motors related to turn-to-left steering.

The controller 140 may control the operation of cooling devices other than the battery cooling device according to events. For example, if the inputter 110 detects a steering angle greater than a reference steering angle, the controller 140 may stop the operation of cooling devices other than the battery cooling device. According to the exemplary embodiment, because the battery is "intensively" cooled, a battery charge range necessary for steering may be obtained, and steering of the vehicle may be performed prior to other operations, thereby improving the efficiency of the vehicle. Here, for example, a state where the battery being "intensively" cooled corresponds to a state where only the battery is being cooled in the vehicle.

The controller 140 may start or stop stealth driving according to the charge state of the battery. For example, if the battery is charged to a level higher than a first reference value (i.e., a level suitable for the stealth driving), the controller 140 may start stealth driving. In another example, if the battery is discharged to a level lower than a second reference value (i.e., a level not suitable for the stealth driving), the controller 140 may stop stealth driving.

The vehicle controlling apparatus 100 of the exemplary embodiment may be used in a medium-sized or large transport vehicle such as a cargo truck or a bus carrying people. In another exemplary embodiment, the vehicle controlling apparatus 100 may be used in a medium-sized or large robot. According to the exemplary embodiment, the vehicle controlling apparatus 100 may be used to increase the lifespan of a battery of a hybrid vehicle or an electric vehicle that consumes a large amount of electricity.

At least one of the components, elements or units represented by a block as illustrated by reference numerals 100, 110, 120, 130 and 140 in FIG. 1 may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions. Also, at least one of these components, elements or units may further include a processor such as a central processing unit (CPU) that performs the respective functions, a microprocessor, or the like. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

Figure 2:
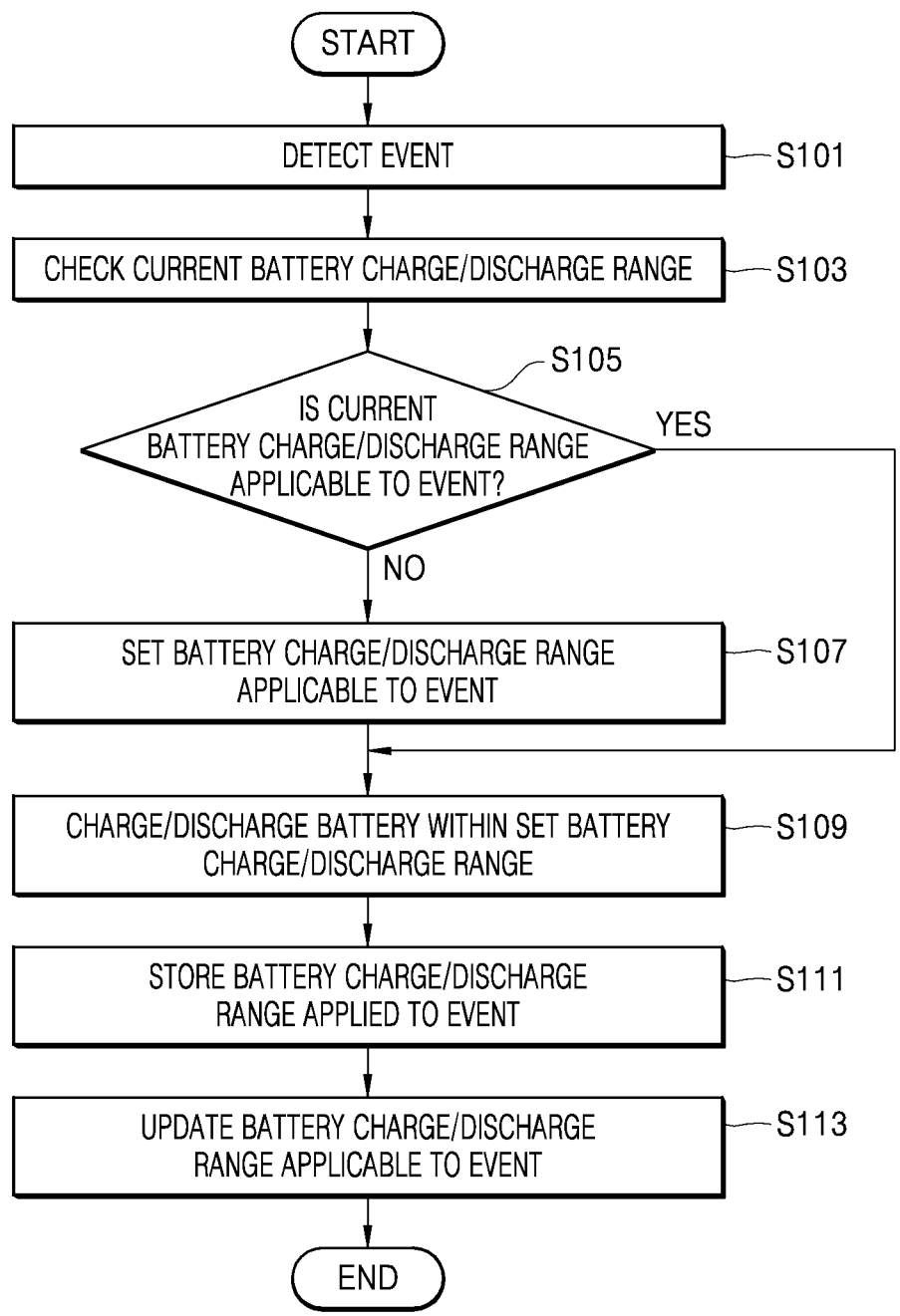
FIG. 2 is a flowchart illustrating a method of controlling a vehicle according to an exemplary embodiment.

FIG. 2 is a flowchart illustrating a method of controlling a vehicle according to an exemplary embodiment.

In the following description of the exemplary embodiment, a method of controlling a vehicle using the vehicle controlling apparatus 100 of the previous exemplary embodiment described with reference to FIG. 1 will be explained, and elements described with reference to FIG. 1 will not be described again or will be briefly described.

Referring to FIG. 2, the inputter 110 detects an event (S101).

The battery manager 120 checks the current battery charge/discharge range (S103).

The battery manager 120 determines whether the current battery charge/discharge range is applicable to the event detected by the inputter 110 (S105).

If it is determined that the current battery charge/discharge range is not applicable to the event, the battery manager 120 sets a battery charge/discharge range applicable to the event (S107).

The controller 140 controls the charging or discharging (hereinafter "charging/discharging") of a battery within the battery charge/discharge range set by the battery manager 120 (S109). Although not shown, if it is determined that the current battery charge/discharge range is applicable to the event, the controller 140 controls the charging/discharging of the battery within the current battery charge/discharge range.

The memory 130 may store the battery charge/discharge range applied to the event (S111).

The memory 130 updates the battery charge/discharge range applicable to the event based on the battery charge/discharge range applied to the event (S113).

According to the method of controlling a vehicle of the exemplary embodiment, an actual battery charge state during an event is used for storing a battery charge/discharge range, thereby providing a battery charge/discharge range optimized for the event.

Figure 3:
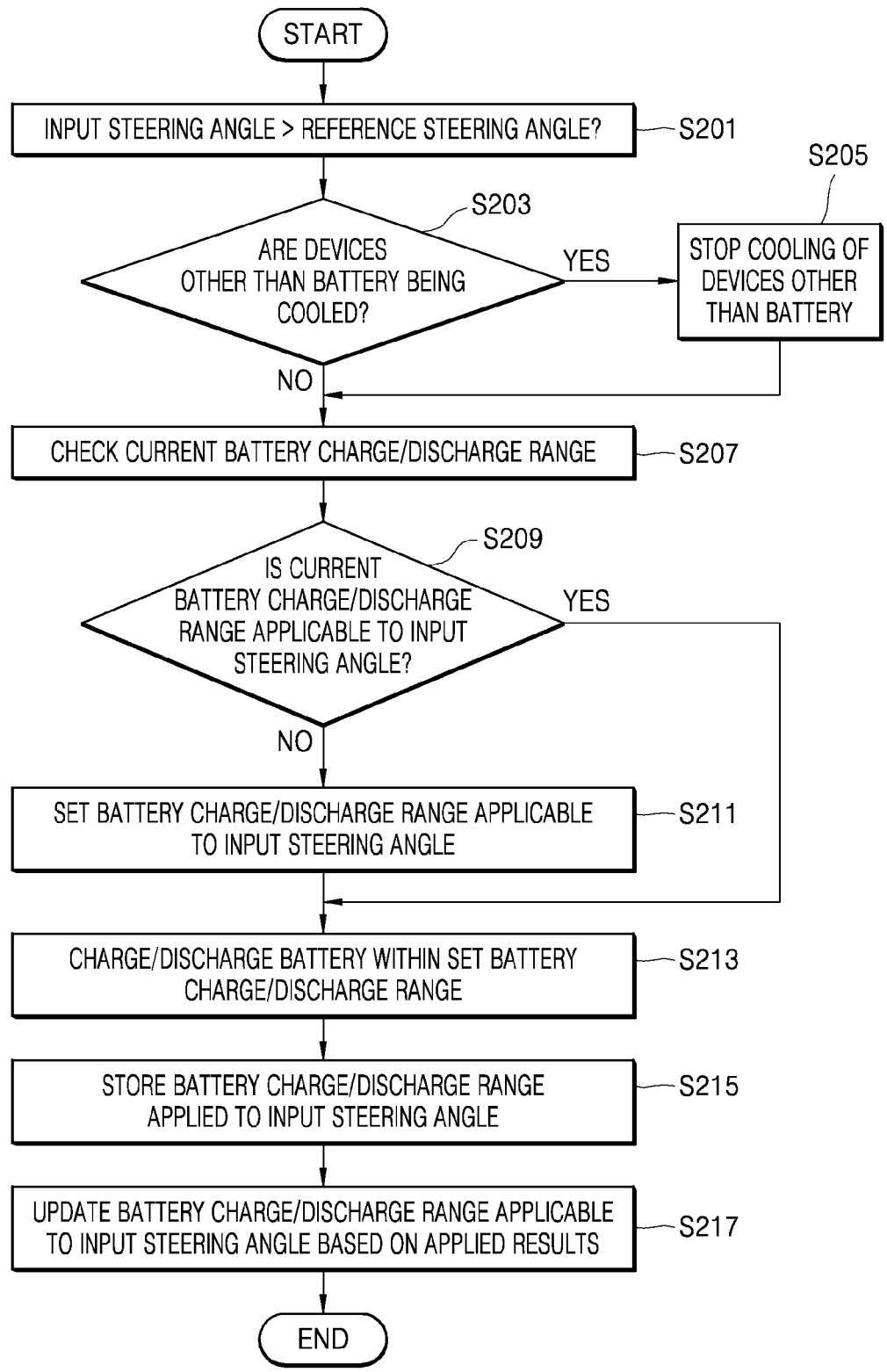
FIG. 3 is a flowchart illustrating a method of controlling a vehicle according to another exemplary embodiment.

FIG. 3 is a flowchart illustrating a method of controlling a vehicle according to another exemplary embodiment.

Referring to FIG. 3, the inputter 110 may receive an input steering angle greater than a reference steering angle (S201). For example, if at least one of the terrain sensor and the front detection sensor of the inputter 110 detects an obstacle within a forward 5-meter range of a road, the inputter 110 may receive an input steering angle greater than the reference steering angle. For example, the reference steering angle may be 10° and the received input steering angle may be 25°. If an input steering angle greater than the reference steering angle is received, the vehicle controlling apparatus 100 may switch to a rapid steering mode. The rapid steering mode may refer to a state for rapid steering of the vehicle. However, the rapid steering mode is not limited thereto.

If the inputter 110 receives an input steering angle greater than the reference steering angle, the controller 140 determines whether devices other than a battery are being cooled (S203).

If devices other than the battery are being cooled, the controller 140 stops cooling of the devices (S205). In the rapid cooling mode, the vehicle controlling apparatus 100 may stop cooling of devices having lower priority than the battery so as to secure the amount of battery charge necessary for steering.

The battery manager 120 checks the current battery charge/discharge range (S207). For example, the current battery charge/discharge range may be between 40% and 60%. In another example, the current battery charge/discharge range may be between 40% and 80%.

The battery manager 120 determines whether the current battery charge/discharge range is applicable to the input steering angle (S209). For example, the battery manager 120 may determine that the current battery charge/discharge range of 40% to 60% is not applicable in the rapid steering mode. In another example, the battery manager 120 may determine that the current battery charge/discharge range of 40% to 80% is applicable in the rapid steering mode.

If it is determined that the current battery charge/discharge range is not applicable to the input steering angle received through the inputter 110, the battery manager 120 sets a battery charge/discharge range applicable to the input steering angle (S211). For example, the battery manager 120 may set an extended range of 40% to 80% as the battery charge/discharge range applicable to the input steering angle, so as to secure the amount of energy necessary in the rapid steering mode. In another example, the battery manager 120 may set a random value to be determined (TBD) within the range of 40% to 80% as a value for the battery charge/discharge range applicable to the input steering angle, so as to secure the amount of energy necessary in the rapid steering mode.

The controller 140 controls the charging/discharging of a battery within the battery charge/discharge range set by the battery manager 120 (S213). For example, the controller 140 may control the charging/discharging of the battery within the extended range of 40% to 80% set by the battery manager 120 as the battery charge/discharge range applicable to the input steering angle. In another example, the controller 140 may control the charging/discharging of the battery within the current battery charge/discharge range of 40% to 80%.

After driving in the rapid steering mode, the memory 130 stores a specific level of the battery charge/discharge range applied to the input steering angle (S215). For example, the controller 140 may control the memory 130 to store a battery charge/discharge level of 75% applied to an input steering angle of 25°.

The memory 130 updates the battery charge/discharge range applicable to the input steering angle based on applied results (S217). For example, the memory 130 may store the battery charge/discharge level of 75% applied to the input steering angle of 25° as an upper limit of a battery charge/discharge range applicable in the rapid steering mode. The upper limit of the battery charge/discharge range applicable in the rapid steering mode may be between 60% and 80%. In another example, a battery charge/discharge level applied to an input steering angle determined as a level corresponding to the rapid steering mode may be stored in the memory 130 as a lower limit of the battery charge/discharge range applicable in the rapid steering mode. For example, the lower limit of the battery charge/discharge range applicable in the rapid steering mode may be between 40% and 50%. As described above, the vehicle controlling apparatus 100 may adjust a battery charge/discharge range applicable to an input steering angle based on a battery charge/discharge range applied to the input steering angle, so as to optimize the charging/discharging of the battery.

Figure 4:
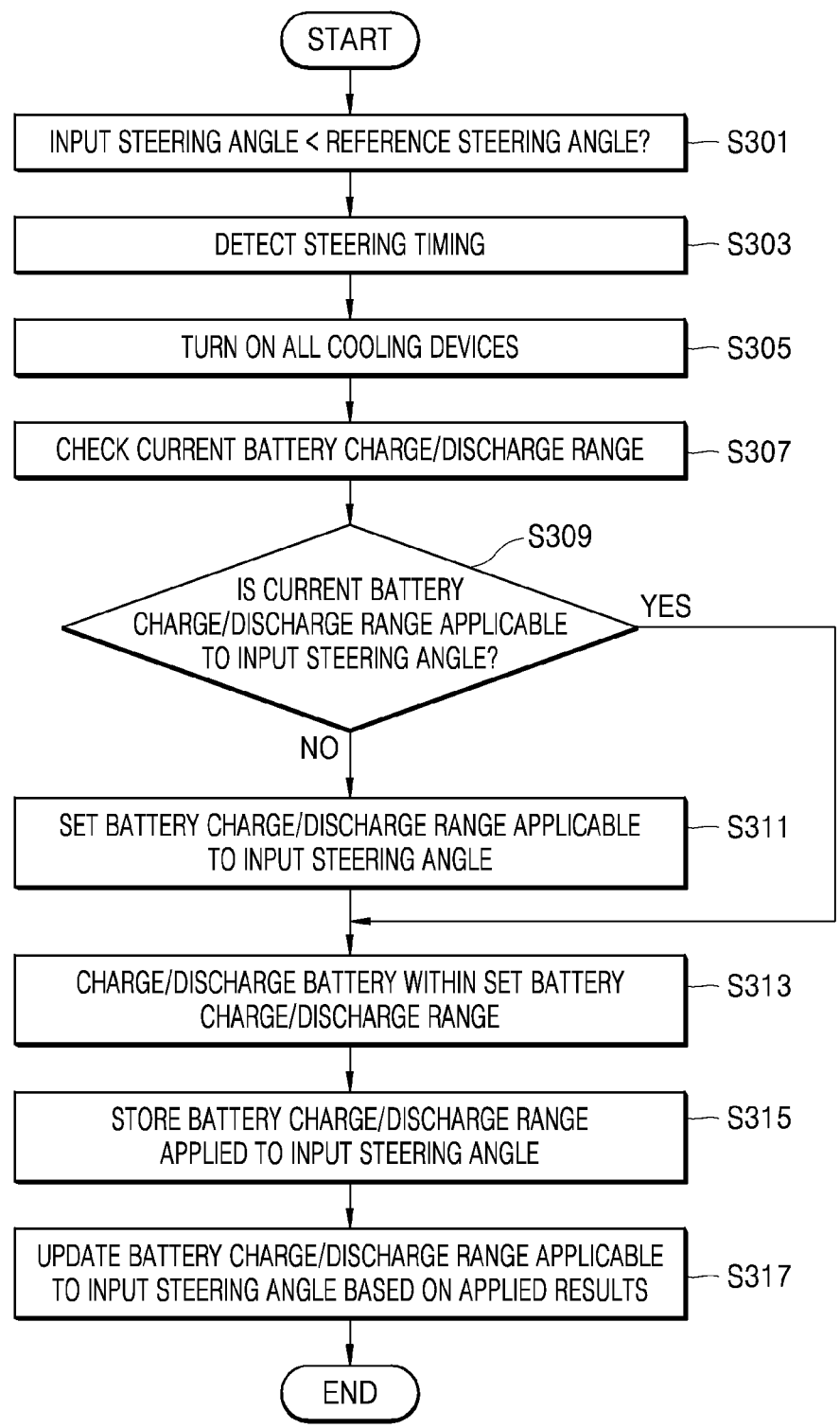
FIG. 4 is a flowchart illustrating a method of controlling a vehicle according to another exemplary embodiment.

FIG. 4 is a flowchart illustrating a method of controlling a vehicle according to another exemplary embodiment.

Referring to FIG. 4, the inputter 110 receives an input steering angle smaller than a reference steering angle (S301). For example, the reference steering angle may be 10° and the received input steering angle may be 5°.

If the inputter 110 receives a steering angle smaller than the reference steering angle, the inputter 110 detects steering timing necessary for steering (S303). If the steering timing is detected, the vehicle controlling apparatus 100 may switch to a normal steering mode. The normal steering mode may refer to a state for gradual steering of the vehicle according to the steering timing. However, the normal steering mode is not limited thereto.

If the inputter 110 detects the steering timing, the controller 140 turns on all cooling devices (S305). The operation of turning on all the cooling devices may refer to an operation in which a battery is not "intensively" cooled. Here, for example, a state where the battery not being "intensively" cooled corresponds to a state where other devices are being cooled in the vehicle along with the battery.

The battery manager 120 checks the current battery charge/discharge range (S307). For example, the current battery charge/discharge range may be between 40% and 80%. In another example, the current battery charge/discharge range may be between 40% and 60%.

The battery manager 120 determines whether the current battery charge/discharge range is applicable to the input steering angle (S309). For example, the battery manager 120 may determine that the current battery charge/discharge range of 40% to 80% is not applicable in the normal steering mode. In another example, the battery manager 120 may determine that the current battery charge/discharge range of 40% to 60% is applicable in the normal steering mode.

If it is determined that the current battery charge/discharge range is not applicable to the input steering angle received through the inputter 110, the battery manager 120 sets a battery charge/discharge range applicable to the input steering angle (S311). For example, the battery manager 120 may limit the battery charge/discharge range applicable to the input steering angle to a range of 40% to 60%, so as to secure the amount of energy necessary in the normal steering mode. In another example, the battery manager 120 may set a random value to be determined (TBD) within the range of 40% to 60% as a value for the battery charge/discharge range applicable to the input steering angle, so as to secure the amount of energy necessary in the normal steering mode.

The controller 140 controls the charging/discharging of the battery within the battery charge/discharge range set by the battery manager 120 (S313). For example, the controller 140 may control the charging/discharging of the battery within the range of 40% to 60% limited by the battery manager 120 as the battery charge/discharge range applicable to the input steering angle. In another example, the controller 140 may control the charging/discharging of the battery within the current battery charge/discharge range of 40% to 60%.

After driving in the normal steering mode, the memory 130 stores a specific level of the battery charge/discharge range applied to the input steering angle (S315). For example, the controller 140 may control the memory 130 to store a battery charge/discharge level of 55% applied to an input steering angle of 5°.

The memory 130 updates the battery charge/discharge range applicable to the input steering angle based on applied results (S317). For example, the memory 130 may store the battery charge/discharge level of 55% applied to the input steering angle of 5° as an upper limit of a battery charge/discharge range applicable in the normal steering mode. The upper limit of the battery charge/discharge range applicable in the normal steering mode may be between 50% and 60%. In another example, a battery charge/discharge level applied to an input steering angle determined as corresponding to the normal steering mode may be stored in the memory 130 as a lower limit of the battery charge/discharge range applicable in the rapid steering mode. The lower limit of the battery charge/discharge range applicable in the normal steering mode may be between 40% and 50%. The vehicle controlling apparatus 100 may adjust the battery charge/discharge range applicable in the normal steering mode to be between 40% and 60% or around 50%, so as to optimally charge and discharge the battery.

Figure 5:
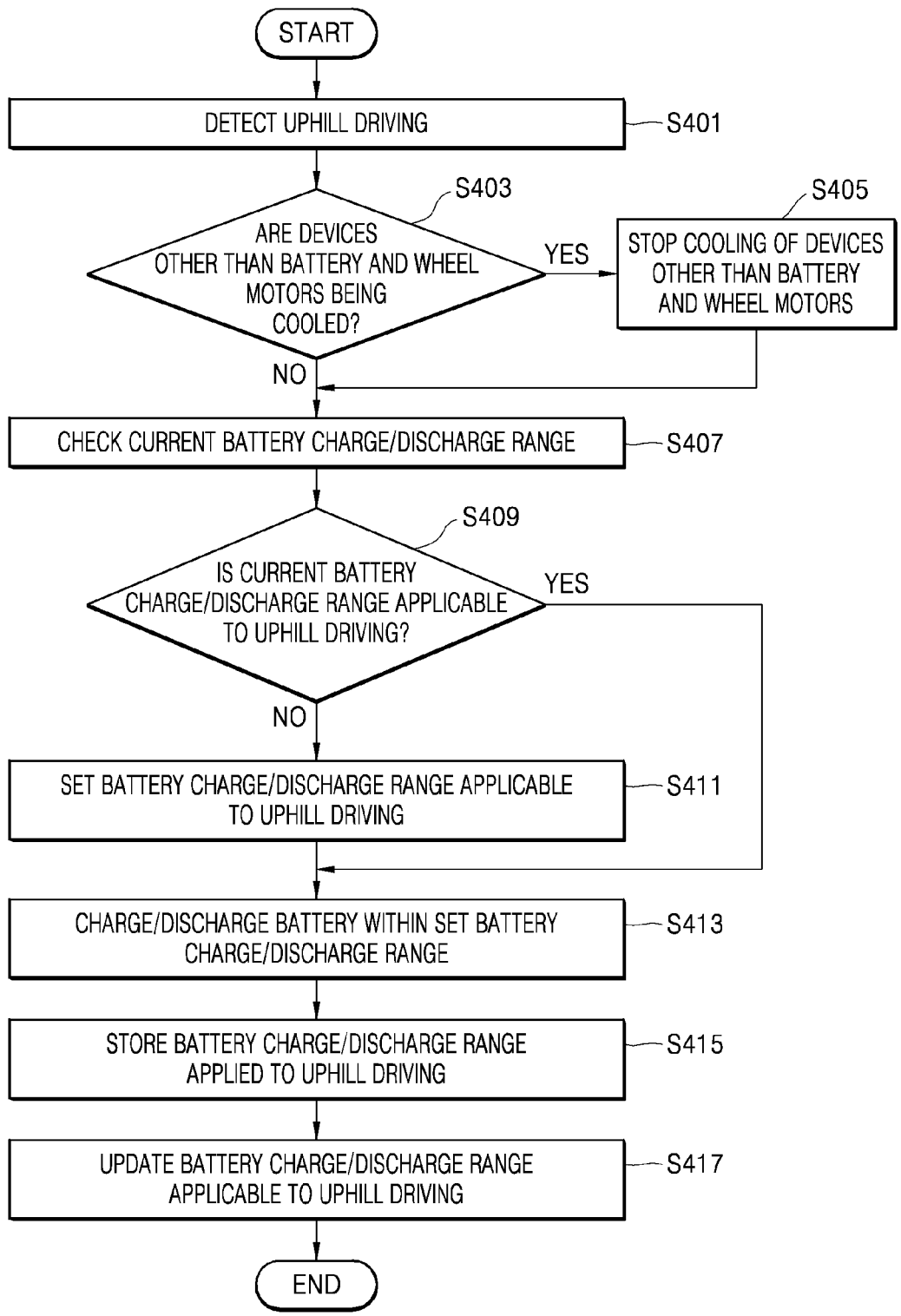
FIG. 5 is a flowchart illustrating a method of controlling a vehicle according to another exemplary embodiment.

FIG. 5 is a flowchart illustrating a method of controlling a vehicle according to another exemplary embodiment.

Referring to FIG. 5, the inputter 110 may detect uphill driving (S401). The inputter 110 may use one or more of an altitude sensor and a gyro sensor to detect uphill driving. For example, if values measured using the altitude sensor constantly increase, the inputter 110 may determine the driving of the vehicle as uphill driving. In another example, if the pitch angle of the gyro sensor increases to 10° or more, the inputter 110 may determine the driving of the vehicle as uphill driving. The uphill angle may be 20°.

If the inputter 110 detects uphill driving, the controller 140 determines whether devices other than a battery and wheel motors are being cooled (S403). If the inputter 110 does not detect uphill driving, the vehicle controlling apparatus 100 may switch to a normal steering mode as described with reference to FIG. 4.

If devices other than the battery and the wheel motors are being cooled, the controller 140 stops cooling of the devices (S405). In the uphill driving, the battery and the wheel motors have increasing load, and thus the vehicle controlling apparatus 100 may stop cooling of devices having lower priority than the battery and the wheel motors so as to ensure efficient uphill driving and cool the battery and the wheel motors.

If the inputter 110 detects uphill driving, the battery manager 120 checks the current battery charge/discharge range (S407). For example, the current battery charge/discharge range may be between 40% and 60%. In another example, the current battery charge/discharge range may be between 40% and 80%.

The battery manager 120 determines whether the current battery charge/discharge range is applicable to the uphill driving (S409). For example, the battery manager 120 may determine that the current battery charge/discharge range of 40% to 60% is not applicable to the uphill driving. In another example, the battery manager 120 may determine that the current battery charge/discharge range of 40% to 80% is applicable to the uphill driving.

If it is determined that the current battery charge/discharge range is not applicable to the uphill driving detected by the inputter 110, the battery manager 120 sets a battery charge/discharge range applicable to the uphill driving (S411). For example, the battery manager 120 may set an extended range of 40% to 80% as the battery charge/discharge range applicable to the uphill driving, so as to secure the amount of energy necessary for the uphill driving. In another example, the battery manager 120 may set a random value to be determined (TBD) within the range of 40% to 80% as a value for the battery charge/discharge range applicable to the uphill driving, so as to secure the amount of energy necessary for the uphill driving.

The controller 140 controls the charging/discharging of the battery within the battery charge/discharge range set by the battery manager 120 (S413). For example, the controller 140 may control the charging/discharging of the battery within the extended range of 40% to 80% set by the battery manager 120 as the battery charge/discharge range applicable to the uphill driving. In another example, the controller 140 may control the charging/discharging of the battery within the current battery charge/discharge range of 40% to 80%.

After the uphill driving, the memory 130 stores a specific level in the battery charge/discharge range applied to the uphill angle (S415). For example, the controller 140 may control the memory 130 to store a battery charge/discharge level of 75% applied to the uphill angle of 20°.

The memory 130 updates the battery charge/discharge range applicable to the uphill driving based on applied results (S417). For example, the memory 130 may store the battery charge/discharge level of 75% applied to the uphill angle of 20° as an upper limit of the battery charge/discharge range applicable to the uphill driving. The upper limit of the battery charge/discharge range applicable to an uphill angle of 10° to 30° may be between 60% and 80%. In another example, the memory 130 may store a battery charge/discharge level applied to an uphill angle as a lower limit of the battery charge/discharge range applicable to the uphill driving. The lower limit of the battery charge/discharge range applicable to the uphill driving may be between 40% and 50%.

Figure 6:
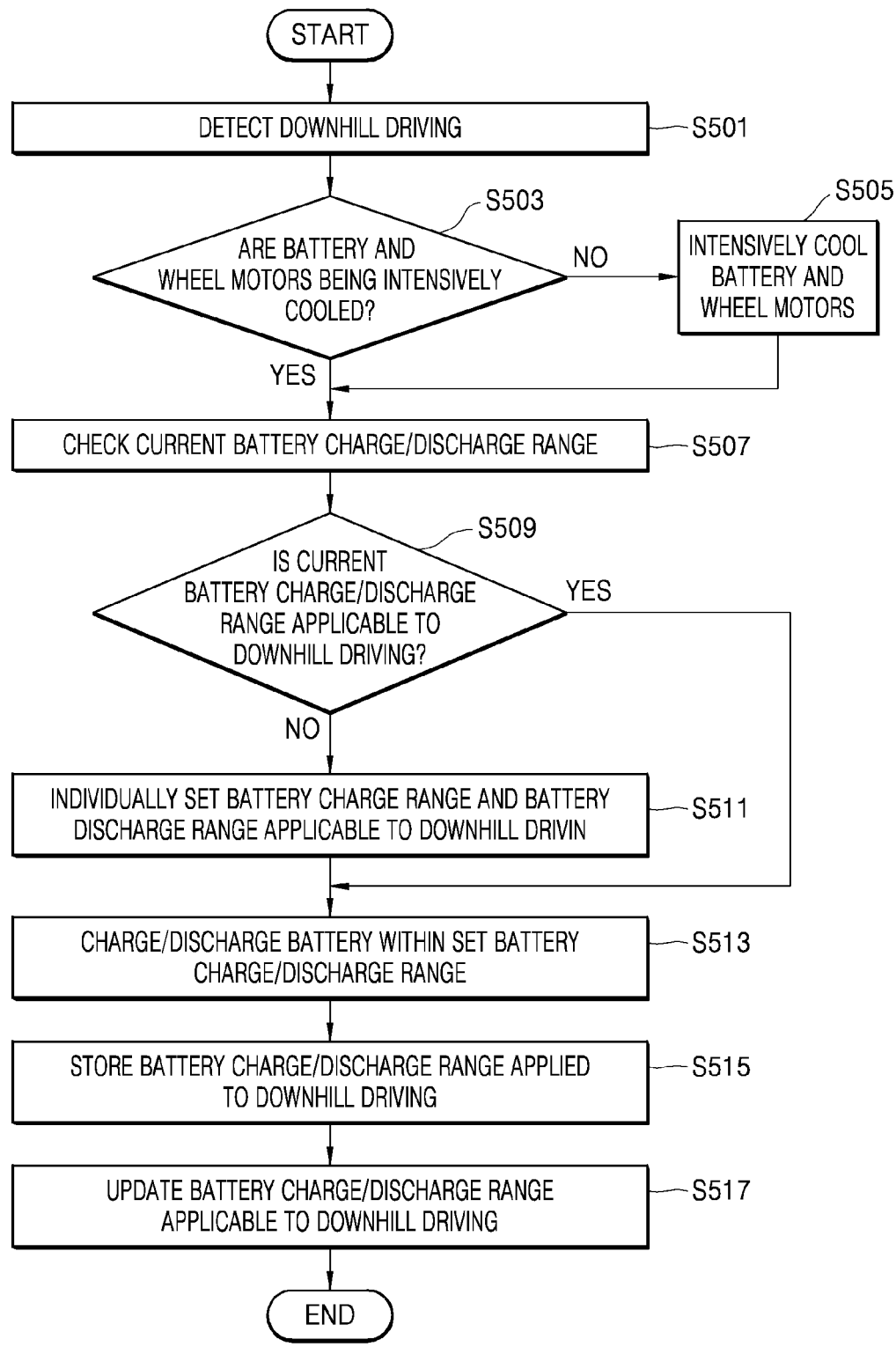
FIG. 6 is a flowchart illustrating a method of controlling a vehicle according to another exemplary embodiment.

FIG. 6 is a flowchart illustrating a method of controlling a vehicle according to another exemplary embodiment.

Referring to FIG. 6, the inputter 110 may detect downhill driving (S501). The inputter 110 may use one or more of an altitude sensor and a gyro sensor to detect downhill driving. For example, if values measured using the altitude sensor constantly decrease, the inputter 110 may determine the driving of the vehicle as downhill driving. In another example, if the pitch angle of the gyro sensor decreases to 10° or more, the inputter 110 may determine the driving of the vehicle as downhill driving. The downhill angle may be 15°.

If the inputter 110 detects downhill driving, the controller 140 determines whether a battery and wheel motors are being "intensively" cooled (S503). For example, the controller 140 determines whether devices other than the battery and the wheel motors in the vehicle are being cooled. If the inputter 110 does not detect downhill driving, the vehicle controlling apparatus 100 may switch to a normal steering mode as described with reference to FIG. 4.

If the battery and the wheel motors are not being intensively cooled, the controller 140 intensively cools the battery and the wheel motors (S505). For example, the controller 140 controls the cooling devices to cool only the battery and the wheel motors. Put it differently, the battery and the wheel motors receive priority with respect to the cooling of the devices of the vehicle. If regenerative braking power is generated on a downhill road, the vehicle controlling apparatus 100 may intensively cool the battery and the wheel motors.

If the inputter 110 detects downhill driving, the battery manager 120 checks the current battery charge/discharge range (S507). For example, the current battery charge/discharge range may be between 40% and 60%.

The battery manager 120 determines whether the current battery charge/discharge range is applicable to the downhill driving (S509). For example, the battery manager 120 may determine that the current battery charge/discharge range of 40% to 60% is not applicable to the downhill driving. In another example, the battery manager 120 may determine that the current battery charge/discharge range of 40% to 80% is applicable to the downhill driving.

If it is determined that the current battery charge/discharge range is not applicable to the downhill driving detected by the inputter 110, the battery manager 120 sets a battery charge range and a battery discharge range that are applicable to the downhill driving (S511). For example, the battery manager 120 may set an extended range of 40% to 80% as the battery charge range applicable to the downhill driving, so as to secure the amount of energy necessary for the downhill driving. In another example, the battery manager 120 may set a random value to be determined (TBD) within the range of 40% to 80% as a value for the battery charge range applicable to the downhill driving. In another example, the battery manager 120 may limit the battery discharge range applicable to the downhill driving to the range of 40% to 50% because driving power is not necessary for the downhill driving. In another example, the battery manager 120 may set a random value to be determined (TBD) within the range of 40% to 50% as a value for the battery discharge range applicable to the downhill driving.

The controller 140 controls the charging/discharging of the battery within the battery charge/discharge range set by the battery manager 120 (S513). For example, the controller 140 may control the charging of the battery within the extended range of 40% to 80% set by the battery manager 120 as the battery charge range applicable to the downhill driving. In another example, the controller 140 may control the charging of the battery within the current battery charge range of 40% to 80%. In another example, the controller 140 may control the discharging of the battery within the range of 40% to 50% set by the battery manager 120 as the battery discharge range applicable to the downhill driving. In another example, the controller 140 may control the discharging of the battery within the current battery charge/discharge range of 40% to 50%.

After the downhill driving, the memory 130 stores the battery charge/discharge range applied to the downhill angle (S515). For example, the controller 140 may control the memory 130 such that a battery charge level of 70% applied to the downhill angle of 15° for 40 seconds may be stored in the memory 130.

The memory 130 updates the battery charge/discharge range applicable to the downhill driving based on applied results (S517). For example, the memory 130 may store the battery charge level of 70% applied to the downhill angle of 15° for 40 seconds as an upper limit of the battery charge/discharge range applicable to the downhill driving. The upper limit of the battery charge/discharge range applicable to a downhill angle of 10° to 30° may be between 60% and 80%. In another example, the memory 130 may store a battery charge/discharge level applied to a downhill angle as a lower limit of the battery charge/discharge range applicable to the uphill driving. The lower limit of the battery charge/discharge range applicable to the downhill driving may be between 40% and 50%. As described above, the vehicle controlling apparatus 100 may adjust a battery charge/discharge range applicable to a downhill angle based on a battery charge/discharge range applied to the downhill angle so as to sufficiently store regenerative power.

Figure 7:
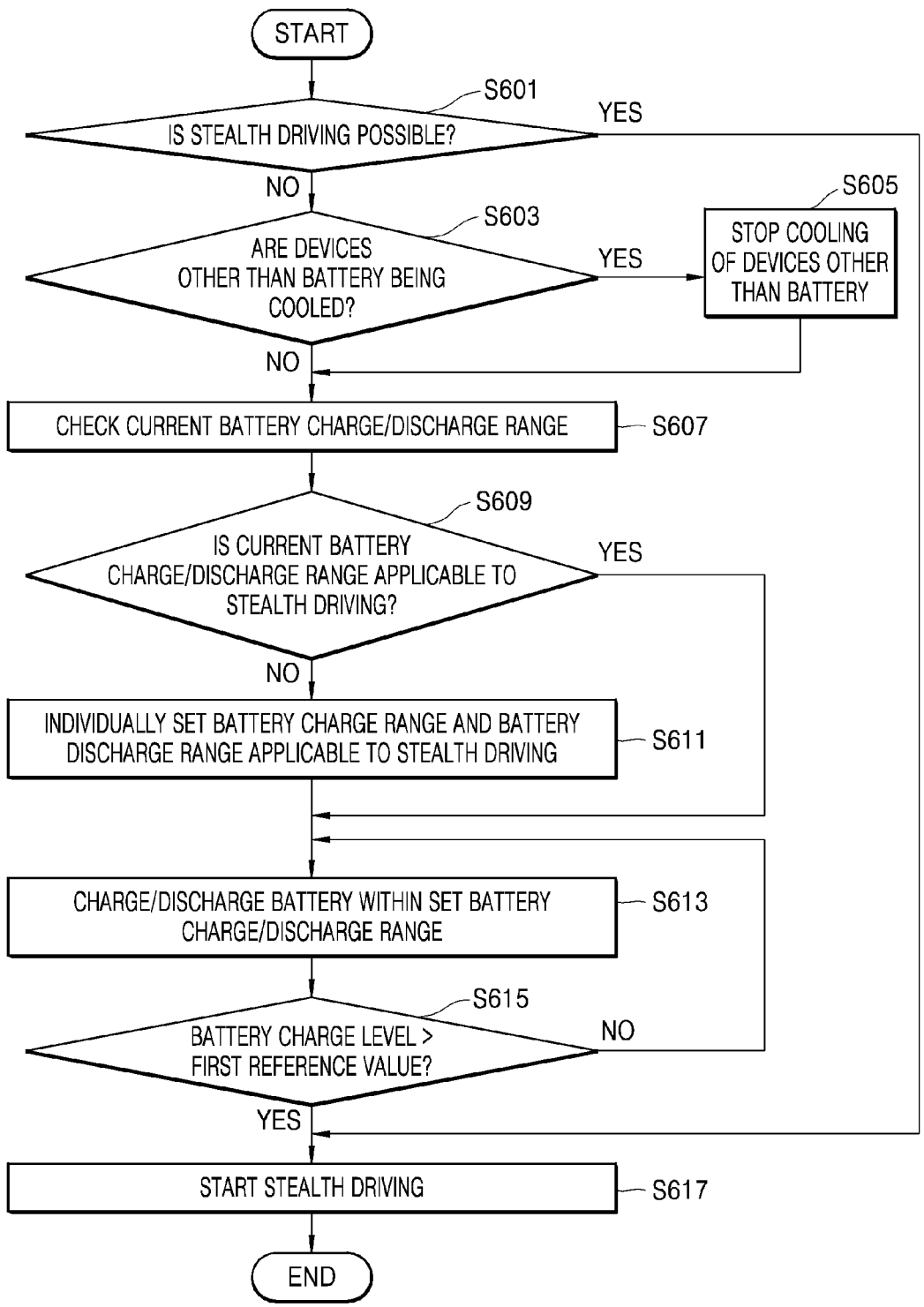
FIG. 7 is a flowchart illustrating a method of controlling a vehicle according to another exemplary embodiment.

FIG. 7 is a flowchart illustrating a method of controlling a vehicle according to another exemplary embodiment.

Referring to FIG. 7, if the inputter 110 receives a stealth driving command, the battery manager 120 determines whether stealth driving is possible (S601). If a stealth driving command is received, the vehicle controlling apparatus 100 may switch to a stealth driving preparation mode. The stealth driving preparation mode may refer to a mode in which a battery of the vehicle is charged for stealth driving. However, the stealth driving preparation mode is not limited thereto.

If the battery manager 120 determines that stealth driving is possible, the vehicle controlling apparatus 100 switches to a stealth driving mode, and the controller 140 starts stealth driving (S617).

If the battery manager 120 determines that stealth driving is impossible, the controller 140 determines whether devices other than the battery are being cooled (S603).

If devices other than the battery are being cooled, the controller 140 stops cooling of the devices (S605) other than the battery. In the stealth driving preparation mode, the vehicle controlling apparatus 100 may stop cooling of devices having lower priority than the battery so as to secure energy necessary for stealth driving.

The battery manager 120 checks the current battery charge/discharge range (S607). For example, the current battery charge/discharge range may be between 40% and 60%. In another example, the current battery charge/discharge range may be between 40% and 80%.

The battery manager 120 determines whether the current battery charge/discharge range is applicable to the stealth driving (S609). For example, the battery manager 120 may determine that the current battery charge/discharge range of 40% to 60% is not applicable to the stealth driving. In another example, the battery manager 120 may determine that the current battery charge/discharge range of 40% to 80% is applicable to the stealth driving.

If it is determined that the current battery charge/discharge range is not applicable to the stealth driving, the battery manager 120 sets a battery charge range and a battery discharge range that are applicable to the stealth driving (S611). For example, the battery manager 120 may widen the battery charge range applicable to the stealth driving up to a maximum value, so as to secure the amount of energy necessary for the stealth driving. For example, in the stealth driving preparation mode, the battery manager 120 may widen the battery charge range applicable to the stealth driving up to 80%. In another example, in the stealth driving preparation mode, the battery manager 120 may limit the battery discharge range to a range of 40% to 50% so as to secure necessary energy.

The controller 140 controls the charging/discharging of the battery within the battery charge/discharge range set by the battery manager 120 (S613). For example, the controller 140 may control the charging/discharging of the battery such that the battery may be charged to a maximum battery charge level of 80%.

The battery manager 120 compares the charge level of the battery with a first reference value (S615). For example, the first reference value may be the maximum battery charge level of 80%. However, the first reference value is not limited thereto.

If the battery manager 120 determines that the charge level of the battery is higher than the first reference value, the controller 140 starts the stealth driving (S617). If the battery manager 120 determines that the charge level of the battery is higher than the first reference value, the vehicle controlling apparatus 100 may switch to the stealth driving mode.

If the battery manager 120 determines that the charge level of the battery is lower than the first reference value, the controller 140 controls the charging/discharging of the battery until the charge level of the battery becomes higher than the first reference value.

Figure 8:
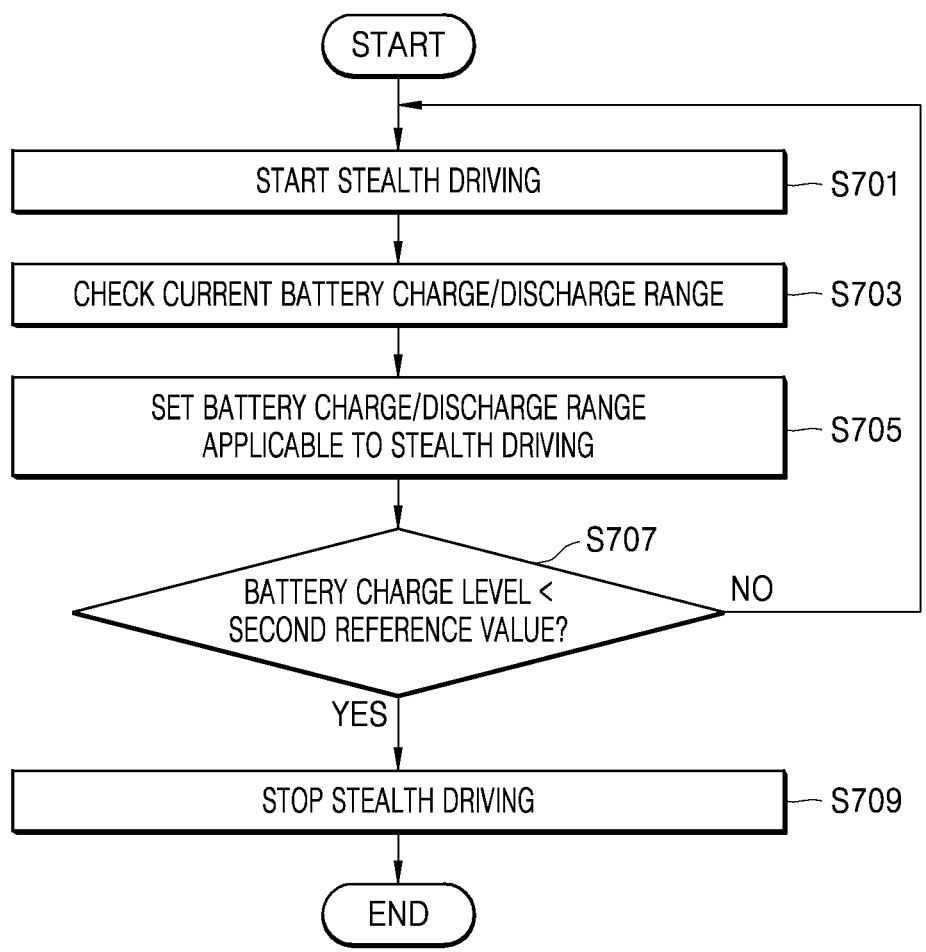
FIG. 8 is a flowchart illustrating a method of controlling a vehicle according to another exemplary embodiment.

FIG. 8 is a flowchart illustrating a method of controlling a vehicle according to another exemplary embodiment.

Referring to FIG. 8, the controller 140 starts stealth driving (S701). The controller 140 may start the stealth driving as described with reference to FIG. 7. The method of starting stealth driving is not limited thereto. The stealth driving may refer to a mode in which the vehicle is driven using only electric energy. However, the stealth driving is not limited thereto.

The battery manager 120 determines whether the current battery charge/discharge range is applicable to the stealth driving (S703). For example, the current battery charge/discharge range may be between 40% and 80%.

The battery manager 120 sets a battery discharge range applicable to the stealth driving (S705). For example, the battery manager 120 may limit the battery discharge range to a range of 80% to 40% so as to secure energy necessary for the stealth driving. At this time, if the charge level of a battery becomes 35%, the controller 140 may stop the stealth driving and start an engine of the vehicle.

The battery manager 120 compares the charge level of the battery with a second reference value (S707). For example, the second reference value may be a minimal battery charge level of 40%. However, the second reference value is not limited thereto.

If the battery manager 120 determines that the charge level of the battery is lower than the second reference value, the controller 140 stops the stealth driving (S709). If the battery manager 120 determines that the charge level of the battery is lower than the second reference value, the vehicle controlling apparatus 100 may switch to a stealth driving preparation mode.

If the battery manager 120 determines that the charge level of the battery is higher than the second reference value, the controller 140 may carry out the stealth driving until the charge level of the battery becomes lower than the second reference value.

Although not shown in FIG. 8, in the stealth driving mode, the controller 140 may determine whether devices other than the battery are being cooled. If devices other than the battery are being cooled, the controller 140 stops cooling of the devices so as to secure energy necessary for the stealth driving.

Figure 9:
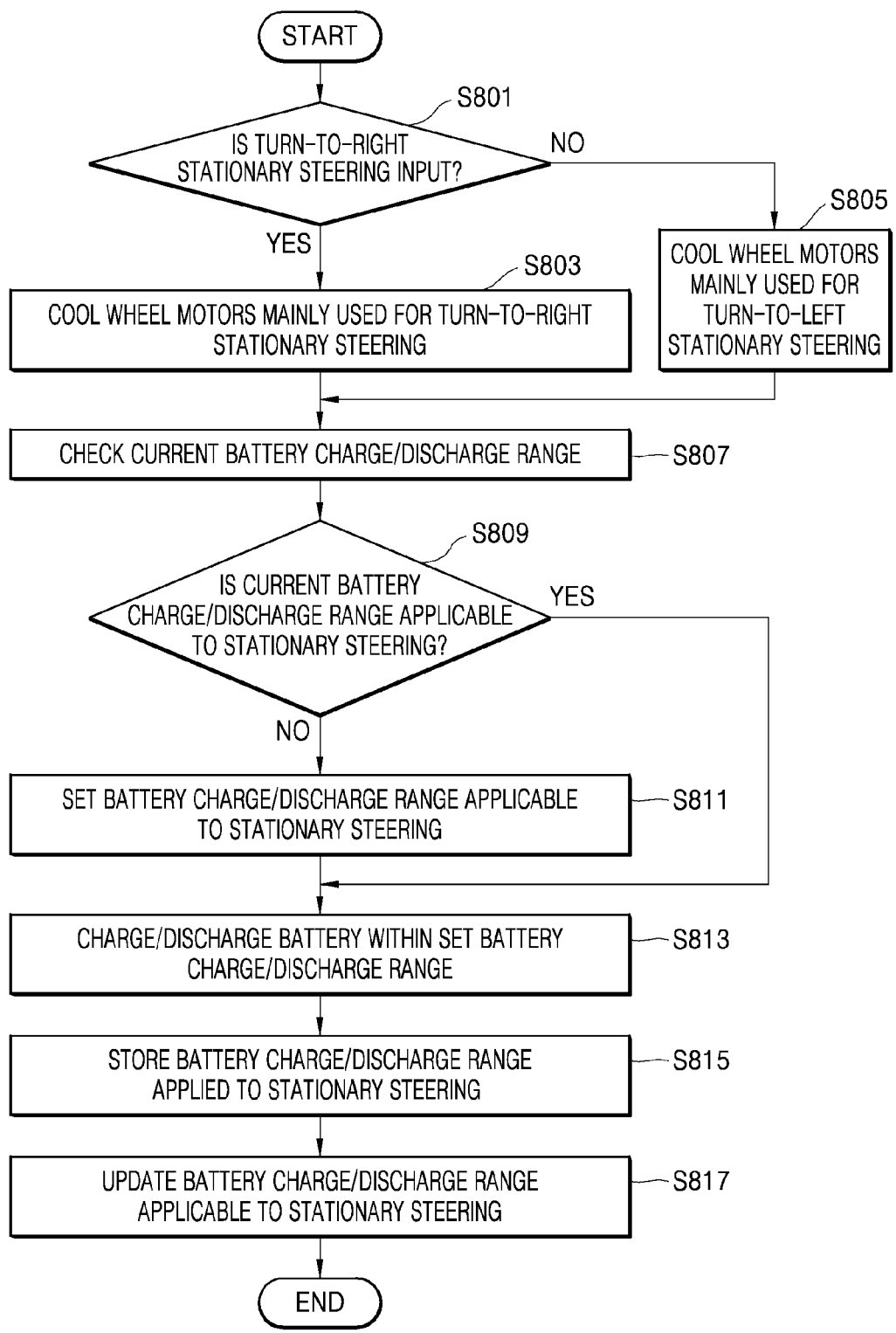
FIG. 9 is a flowchart illustrating a method of controlling a vehicle according to another exemplary embodiment.

FIG. 9 is a flowchart illustrating a method of controlling a vehicle according to another exemplary embodiment.

Referring to FIG. 9, if the inputter 110 may receive a stationary steering command, the controller 140 determines whether the stationary steering command is a turn-to-right stationary steering input (S801).

If it is determined that the stationary steering command is a turn-to-right stationary steering input, the controller 140 cools wheel motors that are mainly operated for turn-to-right stationary steering (S803). The vehicle may include a plurality of wheels making contact with the ground, and wheels intensively receiving a stationary steering force may be varied according to the direction of stationary steering. The wheels may respectively receive energy from wheel motors, and wheel motors that drive wheels intensively receiving a stationary steering force according to the direction of the stationary steering may be selected cooled under the control of the controller 140 so as to minimize energy consumption during the stationary steering. The stationary steering may refer to steering having a maximum steering angle.

A description of wheels intensively receiving a force according to the direction of steering will now be given with reference to FIG. 10.

Figure 10:
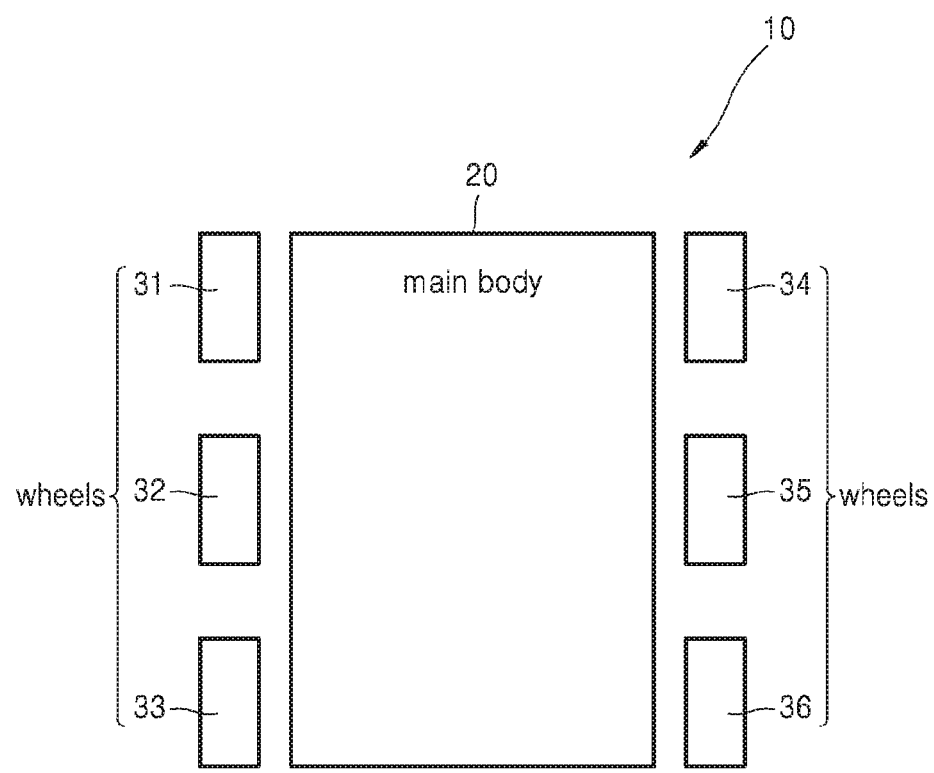
FIG. 10 is a view illustrating a stationary steering operation of a vehicle according to an exemplary embodiment.

FIG. 10 is a view for illustrating a stationary steering operation of a vehicle 10 according to an exemplary embodiment.

Referring to FIG. 10, the vehicle 10 may be moved by driving first, second, third, fourth, fifth to sixth wheels (hereinafter "the first through the sixth wheels) 31 to 36 installed on both sides of a main body 20. During a turn-to-left stationary steering operation, the first wheel 31, the fifth wheel 35, and the sixth wheel 36 of the vehicle 10 may be mainly driven. During a turn-to-right stationary steering operation, the second wheel 32, the third wheel 33, and the fourth wheel 34 of the vehicle 10 may be mainly driven.

For example, the vehicle 10 illustrated in FIG. 10 may be a six-wheel military robot such as a dog-horse robot or a light battle robot. However, the vehicle 10 is not limited thereto. Six-wheel vehicles are capable of stationary steering by using trailing arms. Vehicles (not shown) such as armored vehicles or buses may include wheels other than the middle wheels 32 and 35 shown in FIG. 10 and may perform stationary steering by using double wishbones.

For example, in FIG. 9, if a turn-to-right stationary steering input is received, the controller 140 may operate cooling devices for cooling wheel motors respectively driving the second wheel 32, the third wheel 33, and the fourth wheel 34 that are mainly used for turn-to-right stationary steering.

If a turn-to-left stationary steering input is received, the controller 140 cools wheel motors that are mainly operated for turn-to-left stationary steering (S805). For example, if a turn-to-left stationary steering input is received, the controller 140 may operate cooling devices for cooling wheel motors respectively driving the first wheel 31, the fifth wheel 35, and the sixth wheel 36 that are mainly used for turn-to-left stationary steering.

The battery manager 120 checks the current battery charge/discharge range (S807). For example, the current battery charge/discharge range may be between 40% and 60%. In another example, the current battery charge/discharge range may be between 40% and 80%.

The battery manager 120 determines whether the current battery charge/discharge range is applicable to the stationary steering (S809). For example, the battery manager 120 may determine that the current battery charge/discharge range of 40% to 60% is not applicable to the stationary steering. In another example, the battery manager 120 may determine that the current battery charge/discharge range of 40% to 80% is applicable to the stationary steering.

If it is determined that the current battery charge/discharge range is not applicable to the stationary steering, the battery manager 120 sets a battery charge/discharge range applicable to the stationary steering (S811). For example, the battery manager 120 may set an extended range of 40% to 80% as the battery charge/discharge range applicable to the stationary steering, so as to secure energy necessary for the stationary steering. In another example, the battery manager 120 may set a random value to be determined (TBD) within the range of 40% to 80% as a value for the battery charge/discharge range applicable to the stationary steering, so as to secure energy necessary for the stationary steering.

The controller 140 controls the charging/discharging of a battery within the battery charge/discharge range set by the battery manager 120 (S813). For example, the controller 140 may control the charging/discharging of the battery within the extended range of 40% to 80% set by the battery manager 120 as the battery charge/discharge range applicable to the stationary steering. In another example, the controller 140 may control the charging/discharging of the battery within the current battery charge/discharge range of 40% to 80%.

After the stationary steering, the memory 130 stores a specific level of the battery charge/discharge range applied to the stationary steering (S815). For example, the controller 140 may control the memory 130 such that a battery charge level of 70% applied to the turn-to-right stationary steering for 30 seconds may be stored in the memory 130.

The memory 130 updates the battery charge/discharge range applicable to the stationary steering based on applied results (S817). For example, the battery charge level of 70% applied to the turn-to-right stationary steering for 30 seconds may be stored in the memory 130 as an upper limit of a battery charge range applicable to the turn-to-right stationary steering. The upper limit of the battery charge/discharge range applicable to the turn-to-right stationary steering may be between 60% and 80%. The lower limit of the battery charge/discharge range applicable to the turn-to-right stationary steering may be between 40% and 50%. As described above, the vehicle controlling apparatus 100 may adjust a battery charge/discharge range applicable to stationary steering based on a battery charge/discharge range applied to the stationary steering, so as to guarantee the operation of stationary steering.

Figure 11:
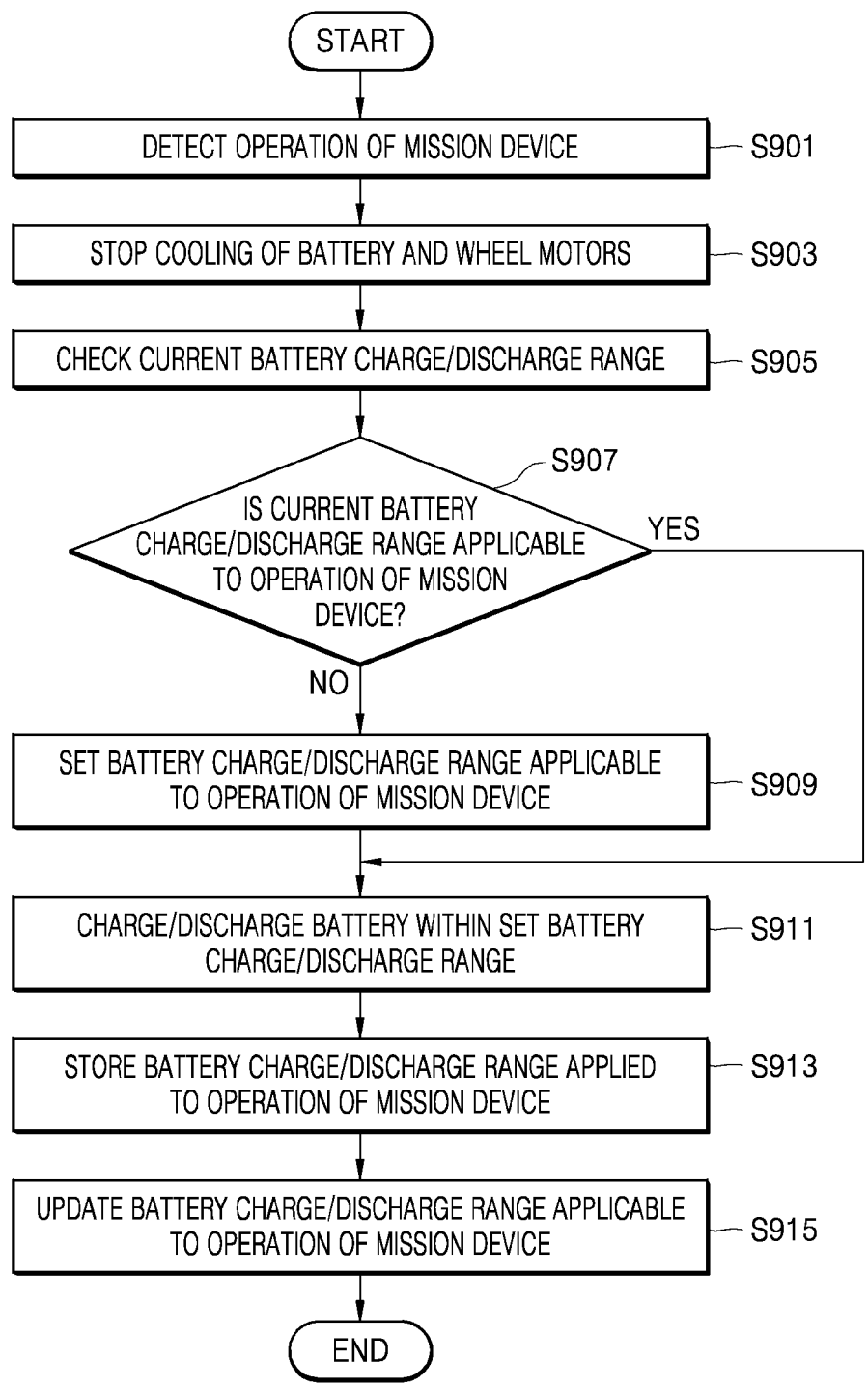
FIG. 11 is a flowchart illustrating operations of a vehicle equipped with a mission device according to an exemplary embodiment.

FIG. 11 is a flowchart illustrating operations of a vehicle equipped with a mission device according to an exemplary embodiment.

Referring to FIG. 11, the inputter 110 detects an operation of the mission device (S901). The inputter 110 included in the vehicle performing a mission may detect an operation of the mission device. The mission device may be a device such as a monitoring device or a repeater for communication. However, the mission device is not limited thereto. The mission device uses power obtained by converting the power of a battery, and thus the charging/discharging of the battery may be controlled according to the operation of the mission device.

While the vehicle is stationary or in a low-speed driving state, if an operation of the mission device is detected through the inputter 110, the controller 140 stops cooling of the battery and wheel motors (S903). If the mission device such as a monitoring device or a communication repeater is operated, the vehicle controlling apparatus 100 may give the highest operation priority to the mission device and may give relatively low operation priority to other devices such the battery or motors. For example, if the mission device is operated, the vehicle controlling apparatus 100 may intensively cool the mission device and stop cooling of other devices such as the battery or the wheel motors so as to supply sufficient power to the mission device.

If the inputter 110 detects an operation of the mission device, the battery manager 120 checks the current battery charge/discharge range (S905). For example, the current battery charge/discharge range may be between 40% and 60%.

The battery manager 120 determines whether the current battery charge/discharge range is applicable to the operation of the mission device (S907). For example, the battery manager 120 may determine that the current battery charge/discharge range of 40% to 60% is not applicable to the operation of the mission device.

If it is determined that the current battery charge/discharge range is not applicable to the operation of the mission device detected by the inputter 110, the battery manager 120 sets a battery charge/discharge range applicable to the operation of the mission device (S909). For example, the battery manager 120 may set an extended range of 40% to 80% as the battery charge/discharge range applicable to the operation of the mission device, so as secure energy necessary for the operation of the mission device. In another example, the battery manager 120 may set a random value to be determined (TBD) within the range of 40% to 80% as a value for the battery charge/discharge range applicable to the operation of the mission device, so as to secure energy necessary for the operation of the mission device.

The controller 140 controls the charging/discharging of the battery within the battery charge/discharge range set by the battery manager 120 (S911). For example, the controller 140 may control the charging/discharging of the battery within the extended range of 40% to 80% set by the battery manager 120 as the battery charge/discharge range applicable to the operation of the mission device.

After the operation of the mission device, the memory 130 stores a specific level of the battery charge/discharge range applied to the operation of the mission device (S913).

The memory 130 updates the battery charge/discharge range applicable to the operation of the mission device based on applied results (S915).

Thereafter, if the vehicle starts to move or the velocity of the vehicle increases, the vehicle controlling apparatus 100 may reset the operation priority of the mission device to be lower than the operation priority of other devices such as the battery and the motors used for driving. For example, when the mission device is not operated, the vehicle controlling apparatus 100 may intensively cool devices other than the mission device and stop cooling of the mission device.

Figure 12:
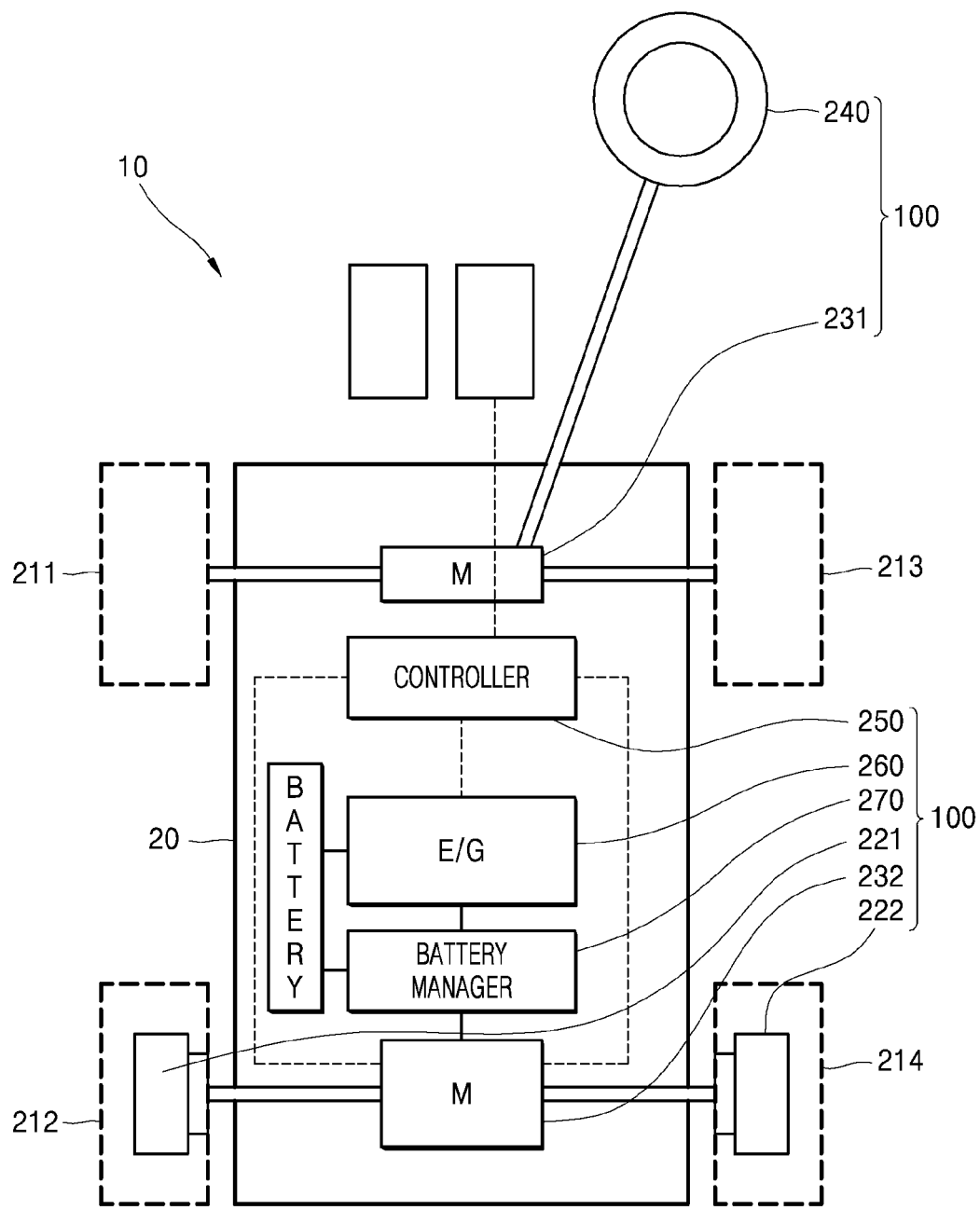
FIG. 12 is a view illustrating a vehicle including a vehicle controlling apparatus according to an exemplary embodiment.

FIG. 12 is a view illustrating a vehicle 10 including a vehicle controlling apparatus 100 according to an exemplary embodiment.

Referring to FIG. 12, the vehicle 10 includes a main body 20 and a plurality of wheels 211, 212, 213, and 214.

For example, the vehicle 10 may be driven by an electric power steering method. The vehicle controlling apparatus 100 includes one or more wheel motors 221 and 222, an electric power steering motor 231, a traction motor 232, a steering wheel 240, a controller 250, an engine/generator (E/G) unit 260, and a battery manager 270. The vehicle controlling apparatus 100 may further include additional elements not shown in FIG. 12.

The wheel motors 221 and 222 may individually drive the wheels 212 and 214 respectively connected to thereto.

The electric power steering motor 231 may be an electric motor for controlling steering angles according to steering amounts input through the steering wheel 240. The electric power steering motor 231 may perform Ackerman steering. However, the electric power steering motor 231 is not limited thereto.

The controller 250 may control the charging/discharging of the battery within a battery charge/discharge range.

Under the control of the controller 250, the engine/generator unit 260 may operate a generator to charge the battery.

The battery manager 270 may control balancing between battery cells and perform battery charging/discharging operations according to a set battery charge/discharge range. The battery manager 270 may include the battery. However, the battery manager 270 is not limited thereto.

Figure 13:
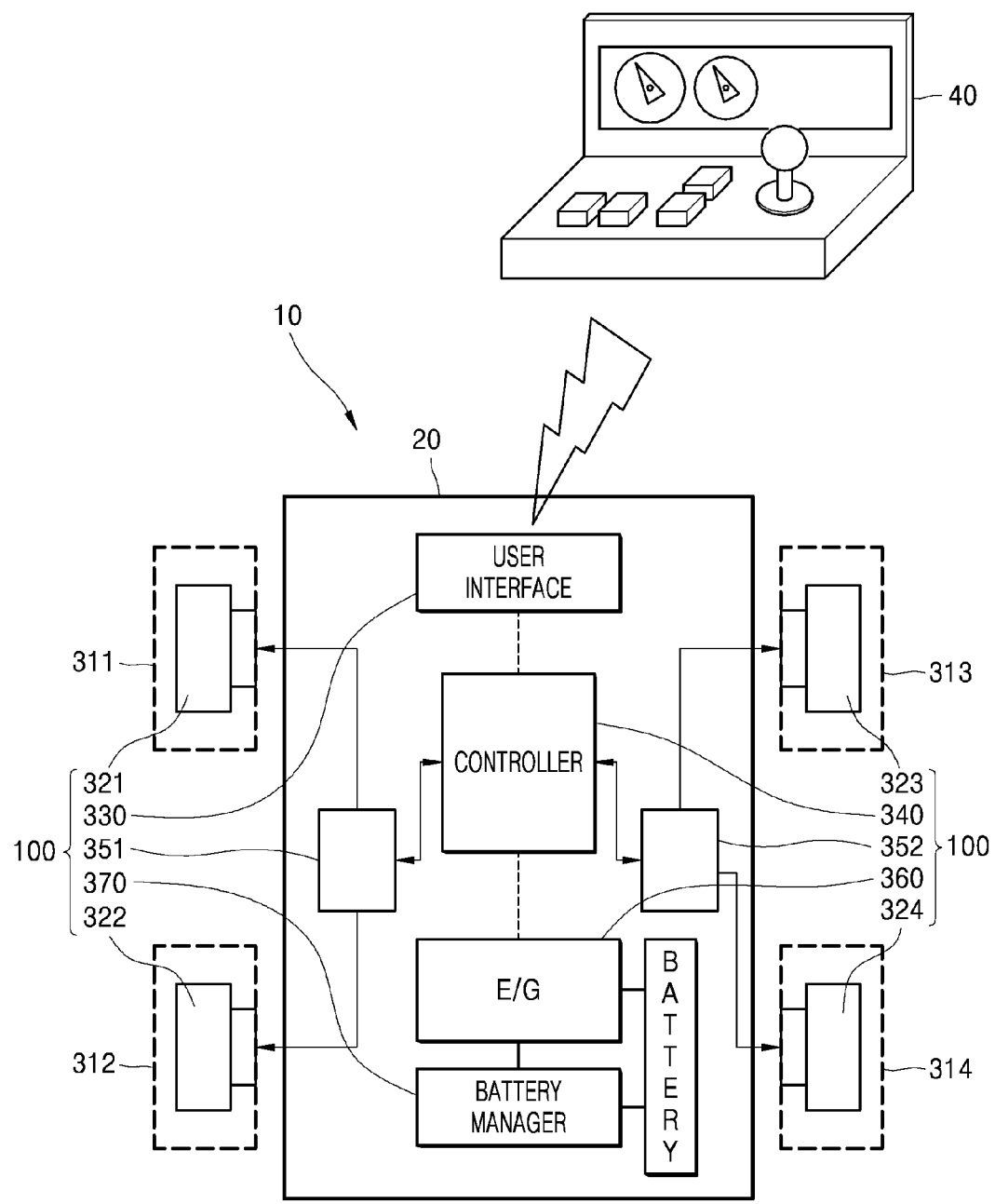
FIG. 13 is a view illustrating a vehicle including a vehicle controlling apparatus according to another exemplary embodiment.

FIG. 13 is a view illustrating a vehicle 10 including a vehicle controlling apparatus 100 according to another exemplary embodiment.

Referring to FIG. 13, the vehicle 10 includes a main body 20 and a plurality of wheels 311, 312, 313, and 314.

For example, the vehicle 10 may be driven by a skid steering method. The vehicle controlling apparatus 100 includes one or more wheel motors 321, 322, 323, and 324, a user interface 330, a controller 340, motor controllers 351 and 352, an engine/generator unit 360, and a battery manager 370. The vehicle controlling apparatus 100 may further include additional elements not shown in FIG. 13. The vehicle controlling apparatus 100 may control operations of the vehicle 10 according to remote control commands received from a remote control device 40.

The wheel motors 321, 322, 323, and 324 may individually drive the wheels 311, 312, 313, and 314 respectively connected to thereto. The wheel motors 321, 322, 323, and 324 may be operated according to control commands from the motor controllers 351 and 352.

The user interface 330 may receive one or more of a remote control command and an autonomous driving command from the remote control device 40 through radio waves and may transmit the received commands to the controller 340.

The controller 340 may control the charging/discharging of a battery within a battery charge/discharge range.

Under the control of the controller 340, the engine/generator unit 360 may operate a generator to charge the battery.

The battery manager 370 may control balancing between battery cells and perform battery charging/discharging operations according to a set battery charge/discharge range.

As described above, according to the above exemplary embodiments, the battery charge/discharge range of a large electric vehicle may be adjusted to increase the lifespan of a battery and improve energy efficiency.

According to the above exemplary embodiment, a battery management system may be reliably operated in consideration of energy consumption in various driving environments.

According to the above exemplary embodiments, upper and lower limits of a battery charge range optimized for maintaining a proper charge/discharge level of a battery may be provided for a large vehicle or robot consuming a large amount of energy during steering.

According to the above exemplary embodiments, the apparatus and method for controlling a vehicle may be used for existing driving patterns.

According to the above exemplary embodiments, the lifespan of a battery and energy efficiency may be improved by effectively using existing vehicle components without having to use additional expensive components.

The above exemplary embodiments may be applied to electric power steering vehicles and skid steering vehicles.

According to the above exemplary embodiments, the cooling of a battery may be predicted from steering patterns.

According to the above exemplary embodiments, control methods may be respectively provided for steering such as rapid steering and normal steering, slope driving such as uphill driving and downhill driving, and stealth driving such as in stealth driving preparation mode and stealth driving mode. In addition, control methods for stationary steering may be provided according to types of suspensions.

It should be understood that the exemplary embodiments described herein should be considered in a descriptive sense only and not for purposes of limitation. Descriptions of features or aspects within each exemplary embodiment should typically be considered as available for other similar features or aspects in other embodiments.

While exemplary embodiments have been particularly shown and described above, it will be understood by those of ordinary skill in the art that various changes in form and details may be made therein without departing from the spirit and scope of the inventive concept as defined by the following claims.

What is claimed is:

1. An apparatus for controlling a vehicle, the apparatus comprising:
   an inputter configured to detect an event;
   a memory configured to store a battery charge/discharge range that is applicable to the event;
   a battery manager configured to check a current battery charge/discharge range corresponding to a range for preventing a decrease in a lifespan of a battery and configured to determine whether the current battery charge/discharge range is applicable to the event based on the stored battery charge/discharge range,
   wherein if the current battery charge/discharge range is not applicable to the event, the battery manager is configured to set a battery charge/discharge range that is applicable to the event; and
   a controller configured to control charging or discharging of the battery within the battery charge/discharge range set by the battery manager and configured to update the stored battery charge/discharge range based on a battery charge level detected when the event is completed.

2. The apparatus of claim 1, wherein in response to the inputter detecting an input steering angle greater than a reference steering angle, the memory is configured to store a battery charge level detected when steering with the input steering angle is completed and configured to update a battery charge/discharge range for the input steering angle based on the battery charge level detected when the steering is completed.

3. The apparatus of claim 1, wherein, in response to the inputter detecting a steering timing and an input steering angle smaller than a reference steering angle, the memory is configured to store a battery charge level detected when steering with the input steering angle and configured to update a battery charge/discharge range for the input steering angle based on the battery charge level detected when the steering is completed.

4. The apparatus of claim 2, wherein the inputter comprises:
   at least one electric power steering device configured to detect an Ackerman steering type input; and
   a user interface configured to receive a skid steering type remote driving command, and
   wherein the inputter is configured to detect an Ackerman steering type input steering angle or a skid steering type input steering angle as the event.

5. The apparatus of claim 1, wherein in response to the inputter detecting uphill driving as the event, the memory is configured to store a battery charge level detected when the uphill driving is completed and configured to update a battery charge/discharge range for the uphill driving based on the battery charge level detected when the uphill driving is completed.

6. The apparatus of claim 1, wherein in response to the inputter detecting downhill driving as the event, the battery manager is configured to set a battery charge range applicable to the downhill driving and a battery discharge range for the downhill driving,
   wherein in response to the inputter detecting the downhill driving, the controller is configured to cool the battery and a wheel motor, and
   wherein the memory is configured to store a battery charge level detected when the downhill driving is completed and configured to update the battery charge range for the downhill driving based on the battery charge level detected when the downhill driving is completed.

7. The apparatus of claim 4, wherein the inputter comprises at least one of an altitude sensor and a gyro sensor.

8. The apparatus of claim 1, wherein in response to the inputter receiving a stealth driving command as the event when stealth driving is inoperable, the battery manager is configured to set a battery charge range for the stealth driving and a battery discharge range for the stealth driving, and
   wherein in response to the battery being charged to a charge level higher than a first reference value, the controller is configured to start the stealth driving.

9. The apparatus of claim 1, wherein in response to the inputter receiving a command for stealth driving as the event when the stealth driving is operable, the battery manager is configured to set a battery discharge range for the stealth driving, and
   wherein in response to the battery being discharged to a charge level lower than a second reference value, the controller is configured to stop the stealth driving.

10. The apparatus of claim 1, wherein in response to the inputter receiving an input of turn-to-right stationary steering or turn-to-left stationary steering as the event, the controller is configured to cause at least one wheel motor related to the input to be cooled, and
    wherein the memory is configured to store a battery charge level detected when the stationary steering is completed and configured to update a battery charge/discharge range for the stationary steering based on the battery charge level detected when the stationary steering is completed.

11. A method of controlling a vehicle, the method comprising:
    detecting an event;
    checking a current battery charge/discharge range corresponding to a range for preventing a decrease in a lifespan of a battery;
    determining whether the current battery charge/discharge range is applicable to the event based on a battery charge/discharge range stored in a memory;
    if the current battery charge/discharge range is not applicable to the event, setting a battery charge/discharge range that is applicable to the event;
    charging or discharging the battery within the set battery charge/discharge range; and
    updating the battery charge/discharge range stored in the memory based on a battery charge level detected when the event is completed.

12. The method of claim 11, wherein in response to the event being an input steering angle greater than a reference steering angle, the method further comprises:
    storing a battery charge level detected when steering with the input steering angle is completed; and
    updating a battery charge/discharge range for the input steering angle based on the battery charge level detected when the steering is completed.

13. The method of claim 11, wherein in response to the event being an input steering angle that is smaller than a reference steering angle at a steering timing, the method further comprises:
    storing a battery charge level detected when steering with the input steering angle is completed; and updating a battery charge/discharge range for the input steering angle based on the battery charge level detected when the steering is completed.

14. The method of claim 12, wherein the event comprises an Ackerman steering type input steering angle or a skid steering type input steering angle.

15. The method of claim 11, wherein in response to the event being uphill driving, the method further comprises:
storing a battery charge level detected when the uphill driving is completed; and
updating a battery charge/discharge range for the uphill driving based on the battery charge level detected when the uphill driving is completed.

16. The method of claim 11, wherein in response to the event being downhill driving, the setting of the battery charge/discharge range that is applicable to the event comprises setting a battery charge range for the downhill driving and setting a battery discharge range for the downhill driving,
wherein the method further comprises:
in response to the downhill driving being detected, cooling the battery and a wheel motor;
storing a battery charge level detected when the downhill driving is completed; and
updating the battery charge range for the downhill driving and the battery discharge range for the downhill driving based on the battery charge level detected when the downhill driving is completed.

17. The method of claim 15, wherein the detecting the event comprises using at least one of an altitude sensor and a gyro sensor.

18. The method of claim 11, wherein in response to the event being a command for stealth driving when the stealth driving is inoperable, the setting of the battery charge/discharge range that is applicable to the event comprises setting a battery charge range for the stealth driving and a battery discharge range for the stealth driving,
wherein in response to the battery being charged to a charge level higher than a first reference value, the method further comprises starting the stealth driving.

19. The method of claim 11, wherein in response to the event being a command for stealth driving when the stealth driving is operable, the setting of the battery charge/discharge range that is applicable to the event comprises setting a battery discharge range for the stealth driving,
wherein the charging or discharging the battery comprises discharging the battery within the battery discharge range, and
in response to the battery being discharged to a charge level lower than a second reference value, stopping the stealth driving.

20. The method of claim 11, wherein in response to the event being an input of turn-to-right stationary steering or turn-to-left stationary steering, and the method further comprises:
cooling at least one wheel motor related to the input;
storing a battery charge level detected when the stationary steering is completed; and
updating a battery charge/discharge range for the stationary steering based on the battery charge level detected when the stationary steering is completed.

* * * * *